(12) United States Patent
Cramer

(10) Patent No.: US 9,454,818 B2
(45) Date of Patent: Sep. 27, 2016

(54) METHOD FOR MEASURING THREE ORIENTATIONAL DEGREES OF FREEDOM OF A CUBE-CORNER RETROREFLECTOR

(71) Applicant: FARO Technologies, Inc., Lake Mary, FL (US)

(72) Inventor: Peter G. Cramer, West Chester, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 14/750,267

(22) Filed: Jun. 25, 2015

(65) Prior Publication Data

US 2015/0379714 A1    Dec. 31, 2015

Related U.S. Application Data

(60) Provisional application No. 62/017,973, filed on Jun. 27, 2014.

(51) Int. Cl.

| | |
|---|---|
| *G06K 9/00* | (2006.01) |
| *G06T 7/00* | (2006.01) |
| *G01B 11/00* | (2006.01) |
| *G01S 5/16* | (2006.01) |
| *G01S 7/481* | (2006.01) |
| *G01S 17/66* | (2006.01) |
| *G02B 5/122* | (2006.01) |
| *G06K 9/46* | (2006.01) |
| *G06K 9/62* | (2006.01) |
| *G06T 7/60* | (2006.01) |

(52) U.S. Cl.
CPC ........... *G06T 7/0042* (2013.01); *G01B 11/005* (2013.01); *G01S 5/163* (2013.01); *G01S 7/481* (2013.01); *G01S 17/66* (2013.01); *G02B 5/122* (2013.01); *G06K 9/46* (2013.01); *G06K 9/6202* (2013.01); *G06T 7/608* (2013.01)

(58) Field of Classification Search
None
See application file for complete search history.

(56) References Cited

U.S. PATENT DOCUMENTS

| | | | | |
|---|---|---|---|---|
| 5,267,014 | A * | 11/1993 | Prenninger | G05B 19/18 348/135 |
| 2012/0206716 | A1* | 8/2012 | Cramer | G01B 11/03 356/72 |

OTHER PUBLICATIONS

Notification of Transmittal of the International Search Report and the Written Opinion of the International Searching Authority, or the Declaration fo the Intenational Application No. PCT/US2015/037904 dated Sep. 23, 2015; Mailed Oct. 1, 2015; 12 pages.
Tuytelaars, et al., "Local invariant feature deterctors: A survey", Foundations and Trends in Computer Graphics and Vision, now publishers Inc., US, vol. 3, No. 3, Jan. 1, 2008, pp. 177-280.

* cited by examiner

*Primary Examiner* — Stephen R Koziol
*Assistant Examiner* — Amandeep Saini
(74) *Attorney, Agent, or Firm* — Cantor Colburn LLP

(57) ABSTRACT

A method for determining three orientational degrees of freedom of a cube-corner retroreflector by obtaining with a photosensitive array an image of a three straight marks on the retroreflector and, with a programmable control device, taking a two-dimensional transform of the image and determining the three orientational degrees of freedom.

15 Claims, 31 Drawing Sheets

METHOD FOR MEASURING THREE ORIENTATIONAL DEGREES OF FREEDOM OF A CUBE-CORNER RETROREFLECTOR

CROSS-REFERENCE TO RELATED APPLICATIONS

This application claims the benefit of U.S. Provisional Patent Application No. 62/017,973, filed Jun. 27, 2014, which is incorporated herein by reference in its entirety.

BACKGROUND OF THE INVENTION

The present disclosure relates to a coordinate measuring device. One set of coordinate measurement devices belongs to a class of instruments that measure the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. Coordinate-measuring devices closely related to the laser tracker are the laser scanner and the total station. The laser scanner steps one or more laser beams to points on a surface. It picks up light scattered from the surface and from this light determines the distance and two angles to each point. The total station, which is most often used in surveying applications, may be used to measure the coordinates of diffusely scattering or retroreflective targets. Hereinafter, the term laser tracker is used in a broad sense to include also total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube-corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner. Some laser trackers contain only an ADM without an interferometer. U.S. Pat. No. 7,352,446 ('446) to Bridges et al., the contents of which are herein incorporated by reference in their entirety, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest.

Angle measuring devices such as angular encoders are attached to the mechanical axes of the tracker. The one distance measurement and two angle measurements performed by the laser tracker are sufficient to completely specify the three-dimensional location of the SMR.

Several enhanced laser tracker systems are available or have been proposed for measuring six, rather than the ordinary three, degrees of freedom. The six degrees of freedom include three position degrees of freedom and three orientation degrees of freedom. Herein, the term position will be used to describe the three position degrees of freedom of a 6DOF target, and the term orientation will be used to describe the three orientation degrees of freedom.

Exemplary six degree-of-freedom (6DOF) systems are described by U.S. Pat. No. 7,800,758 ('758) to Bridges et al., the contents of which are herein incorporated by reference in their entirety, and U.S. Published Patent Application No. 2010/0128259 to Bridges et al., the contents of which are herein incorporated by reference in their entirety. Devices of this type will be called 6DOF-capable laser trackers or 6DOF laser trackers for short. In contrast, laser trackers which do not have 6DOF measurement capability will be called simply laser trackers or trackers for short. Trackers can only measure the position of a retroreflector.

Other 6DOF laser tracker designs have been proposed or developed in the past. One such method described in U.S. Pat. No. 4,714,339 to Lau et al. involves mounting the retroreflector in a gimbal mechanism. An integrated position sensitive device (PSD) and servo mechanism enables the retroreflector to pivot automatically to track the incoming laser beam. The orientation is then measured by angular encoders and a tilt sensor, and the orientation data is transmitted from the target to the 6DOF laser tracker by radio.

One type of six-DOF target used in some prior art systems is an augmented target. An augmented target includes a retroreflector for position measurements, and a second independent system for orientation measurements. Examples of augmentation include light emitting diodes (LEDs), angular encoders, position sensitive devices (PSDs), motors, level sensors, and accelerometers. Augmented targets all involve at least two separate subsystems, one for position and at least one more for orientation. Augmented systems require compatible special purpose targets, and augmented targets from different manufacturers are not compatible with one another and therefore are not interchangeable. Such systems also cannot measure the orientation of a non-augmented target such as a retroreflector or a spherically mounted retroreflector.

A laser tracker system which incorporates 6DOF capability offers significant advantages to the user. For example, with a 6DOF laser tracker and a compatible 6DOF probe, surfaces which are not on a direct line of sight from the laser can be measured. This allows interior surfaces such as bore holes to be measured without the need to repeatedly reposition the laser tracker. Also, a 6DOF laser tracker can be used in tandem with a compatible laser line probe. This creates a measuring system which combines the long range of the laser tracker with the touchless measurement capability of the laser line probe. A 6DOF tracker can also be used to monitor the position and orientation of a robot arm, enabling the robot to perform at a higher level of accuracy than would otherwise be possible. Another possible advantage of a 6DOF laser tracker is the ability increase the accuracy of standard SMR position measurements by correcting for centering errors which occur when the vertex of the cube-corner retroreflector does not precisely coincide with the center of the metal sphere. Not all 6DOF designs provide this capability however.

Unfortunately, because of their reliance on augmented targets, existing 6DOF laser trackers require a target that is manufacturer-specific, bulky, heavy, complex, active and costly. If an application requires large numbers of targets, such systems are cost-prohibitive. If a target is lost or damaged, replacement is expensive. Because of the complexity of these targets, they are inherently less reliable than a simple cube-corner retroreflector. Training expense is increased due to the increased complexity. Because augmented targets from different manufacturers are incompatible and cannot be interchanged, users are often forced to purchase their 6DOF laser trackers from a single supplier, increasing their costs and limiting their options. Finally, augmentation methods inherently do not allow for the correction of centering errors in an SMR.

It is clear from the foregoing considerations that a practical alternative to augmented 6DOF targets would be highly desirable. One such alternative is based on imaging. The idea is to collect an image of the cube-corner retroreflector. In principle, the only feature in such an image is a set of three lines which are the projections of the three dihedral lines formed by the intersections of the cube-corner's three flat mirrors. Image analysis methods can be used to determine the plane angles of the three lines, and from these the orientation of the cube-corner can be determined.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A beam of light 46 virtually passes through the gimbal point 22 and is pointed orthogonal to zenith axis 18. In other words, beam of light 46 lies in a plane approximately perpendicular to the zenith axis 18 and that passes through the azimuth axis 20. Outgoing beam of light 46 is pointed in the desired direction by rotation of payload 15 about zenith axis 18 and by rotation of zenith carriage 14 about azimuth axis 20. Motors steer the outgoing light beam by rotating tracker components about the azimuth and zenith axes, in a manner known in the art. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing beam of light 46 travels to the retroreflector target 26, which might be, for example, an SMR as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing beam of light 46 may include one or more wavelengths. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation.

The basic idea of the imaging approach is shown in FIG. 2, FIG. 3 and FIG. 4. In FIG. 2, cube-corner retroreflector 200 comprises three mutually perpendicular plane mirrors 231, 232 and 233 (also herein referred to as reflecting surfaces) which intersect along dihedral lines 211, 212 and 213 (also herein referred to as straight marks). The three dihedral lines intersect at vertex 221. In FIG. 3, the three dihedral lines 211, 212 and 213 of cube-corner 200 are projected onto sensor plane 301 (also herein referred to as a two-dimensional photosensitive array), resulting in three plane lines 201, 202 and 203. Referring finally to FIG. 4, the plane lines 201, 202 and 203 have plane angles 401, 402 and 403 respectively relative to X axis 405. These three angles change in a well-defined way as the orientation of the retroreflector changes. To put it differently, if the three plane angles are known, then the three orientational degrees of freedom of the retroreflector can be determined. (There is ambiguity in the roll angle, but this can be resolved in a straightforward way.) The specific case shown involves collimated illumination without optics. In some embodiments, a lens would be used to accomplish the projection.

Since the retroreflector is used to determine both position and orientation, the imaging method eliminates the need to augment the retroreflector with additional systems. With the imaging approach, a 6DOF target consists of nothing more than a cube-corner retroreflector. As a result, the 6DOF target has all the desired properties: it is small, light, simple, passive, interchangeable and inexpensive. It also makes it possible to correct for centering errors in an SMR. The challenge is to get the desired range, speed and accuracy from an imaging approach.

Existing well-known methods for analyzing images can in principle be used to identify lines and extract their angles. Such methods include the Hough transform, the closely related Radon transform, edge detection methods and convolution methods. Unfortunately, existing image analysis methods are not well suited to the very specific application of finding three angles of three lines in the image of a cube-corner retroreflector to high precision. For one thing, these are all general purpose algorithms which do not take advantage of the prior knowledge that there are always exactly three lines in the image. They also do not take advantage of the fact that a retroreflected image has a very useful property, namely reflection symmetry. In other words, for each point in the image, there is a unique point on the exact opposite side of the cube-corner vertex which is its symmetry partner. In the ideal case, these two points must have exactly the same brightness. Finally, they do more computational work than is needed for this specific application. They solve for both the angles and the positions of the three lines, when only the angles are required for determining the orientation. This means that they are solving for six unknowns rather than three. This makes the computational load much greater than necessary, both in terms of data storage requirements and in terms of the number of arithmetic operations required.

The application of interest here is high speed precision dimensional metrology. In order to accurately measure moving targets, a frame rate on the order of 100 frames per second or more is typically required. Such high data rates are only feasible if the probability of an outlier or an outright failure in any given frame is extremely low. Unfortunately, existing image analysis methods do not meet this requirement. For example, it is well known that the Hough and Radon methods are prone to large errors when the image is degraded by real world effects such dirt in the optics. Since laser trackers are often used in dirty manufacturing environments, this is a serious limitation. Another pathology in real world images is diffraction effects: the image of a cube-corner retroreflector under coherent illumination may include spurious lines which are caused by diffraction. These lines are parallel to the desired lines but displaced from them. Existing methods are not designed to address this pathology. Another limitation of existing methods is insufficient precision. This is true in particular of edge detection and convolution methods. Because of the excessive data storage requirements and excessive numbers of arithmetic operations, existing methods of image analysis are often too slow for the application. Furthermore, existing general purpose image analysis algorithms do not lend themselves to cost effective implementations in special purpose high speed processors such as field programmable gate arrays (FPGAs), application specific integrated circuits (ASICs), digital signal processors (DSPs) and so on, precisely because of their general nature. Finally, existing methods do not perform well with images that are unfocused or defocused.

In summary, what is needed is a 6DOF laser tracker design that uses imaging to gain the advantages of a non-augmented target but avoids the limitations of existing image analysis methods.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

According to an embodiment of the present invention, a method for determining three orientational degrees of freedom of a retroreflector comprises: obtaining on a two-dimensional photosensitive array an image of a first straight mark, a second straight mark, and a third straight mark on the retroreflector that has three mutually perpendicular reflecting surfaces; receiving by a programmable control device a two-dimensional digital array representation of the image; performing with the programmable control device a two-dimensional transform of the two-dimensional digital array to obtain coefficients of sinusoidal basis functions as a first transformed array; determining by the programmable control device the three orientational degrees of freedom based at least in part on the first transformed array; and storing the determined three orientational degrees of freedom.

According to a further embodiment of the present invention, a non-transitory machine readable storage medium including instruction which, when performed by one or more processors, causes the one or more processors to perform a method comprises: obtaining on a two-dimensional photosensitive array an image of a retroreflector having three mutually perpendicular reflecting surfaces, the image including a first straight mark, a second straight mark, and a third straight mark; receiving by the one or more processors a two-dimensional digital array representation of the image; performing with the one or more processors a two-dimensional transform of the two-dimensional digital array to obtain coefficients of sinusoidal basis functions as a first transformed array; determining by the one or more processors three orientational degrees of freedom of the retroreflector based at least in part on the first transformed array; and storing the determined three orientational degrees of freedom.

According to another embodiment of the present invention, a system for determining three orientational degrees of freedom of a retroreflector comprises: the retroreflector having three mutually perpendicular reflecting surfaces, a first straight mark, a second straight mark, and a third straight mark; a two-dimensional photosensitive array; one or more processors; and a non-transitory machine readable storage medium including instruction which, when performed by the one or more processors, causes the one or more processors to perform a method comprising: obtaining on the two-dimensional photosensitive array an image of the first straight mark, the second straight mark, and the third straight mark; receiving by the one or more processors a two-dimensional digital array representation of the image; performing with the one or more processors a two-dimensional transform of the two-dimensional digital array to obtain coefficients of sinusoidal basis functions as a first transformed array; determining by the one or more processors three orientational degrees of freedom based at least in part on the first transformed array; and storing the determined three orientational degrees of freedom.

The above features and advantages and other features and advantages of the invention are readily apparent from the following detailed description of the invention when taken in connection with the accompanying drawings.

BRIEF DESCRIPTION OF THE DRAWINGS

Referring now to the drawings, exemplary embodiments are shown which should not be construed to be limiting regarding the entire scope of the disclosure, and wherein like elements are numbered alike in several FIGURES.

DETAILED DESCRIPTION OF THE INVENTION

Figure 1:
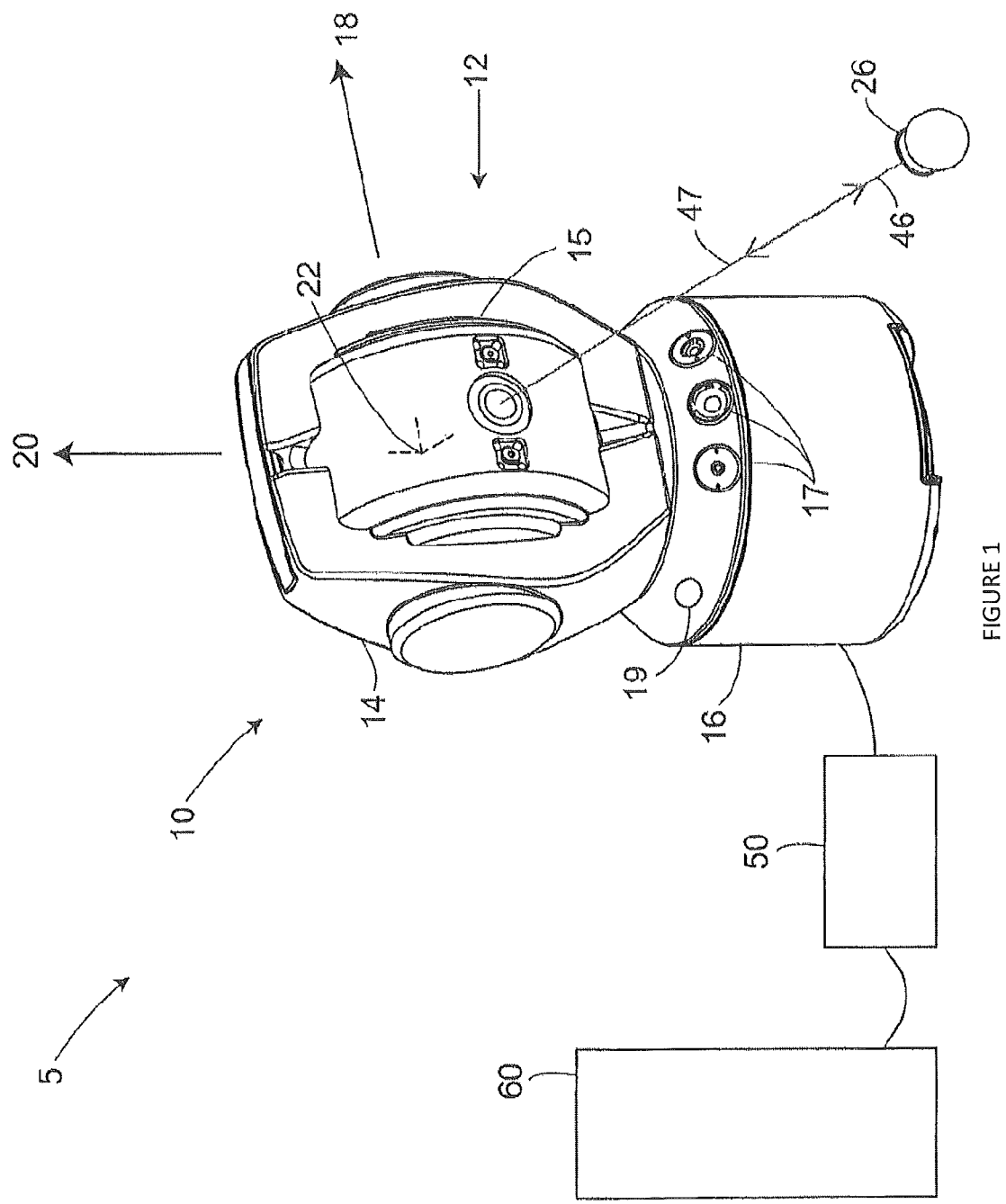
FIG. 1 is a depiction of a laser tracker measuring the position of a spherically mounted retroreflector (SMR)
Figure 2:
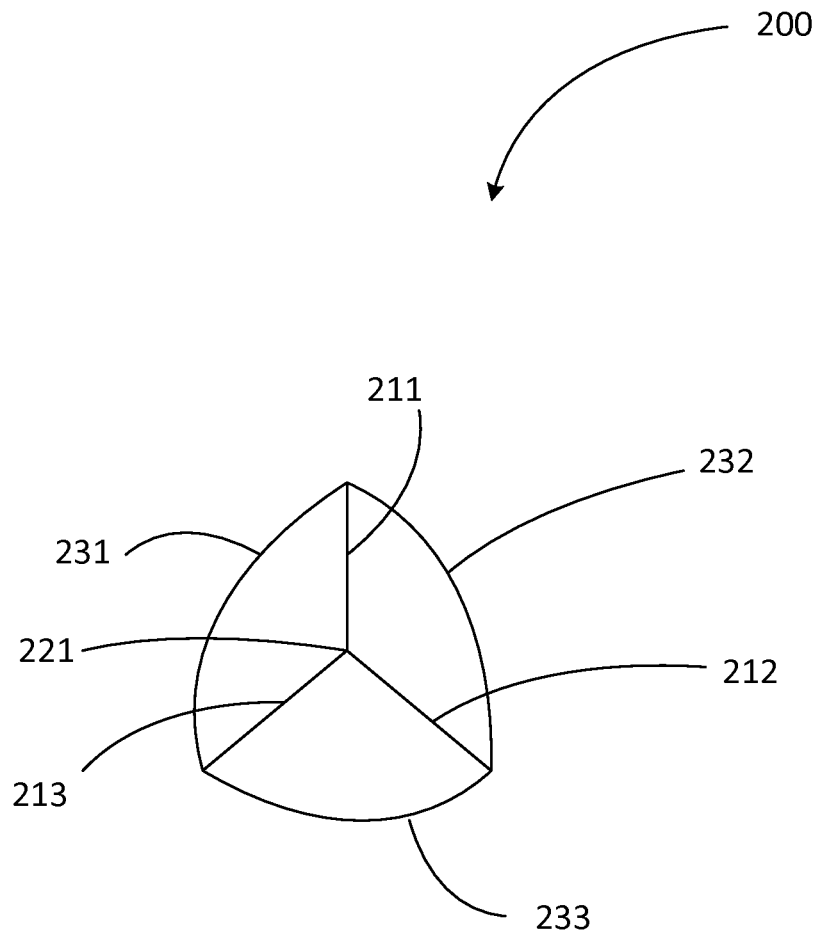
FIG. 2 is a diagram of a cube-corner retroreflector comprising three mutually perpendicular plane mirrors which intersect along three lines called dihedral lines.
Figure 3:
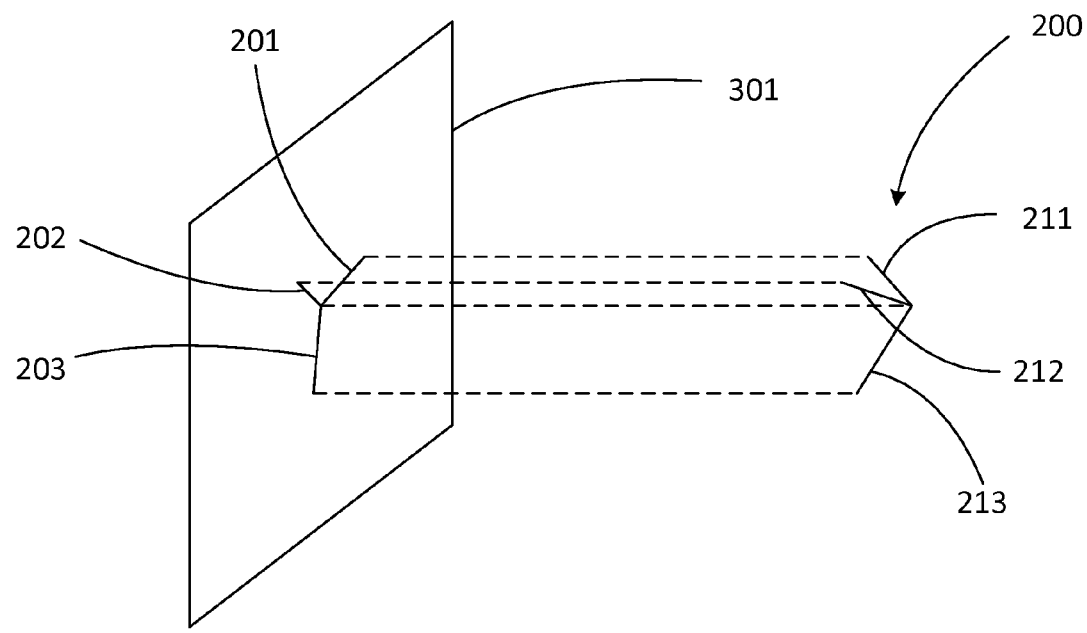
FIG. 3 is an illustration of an optical process whereby the three dihedral lines of a cube-corner retroreflector are optically projected onto the plane of an image sensor.
Figure 4:
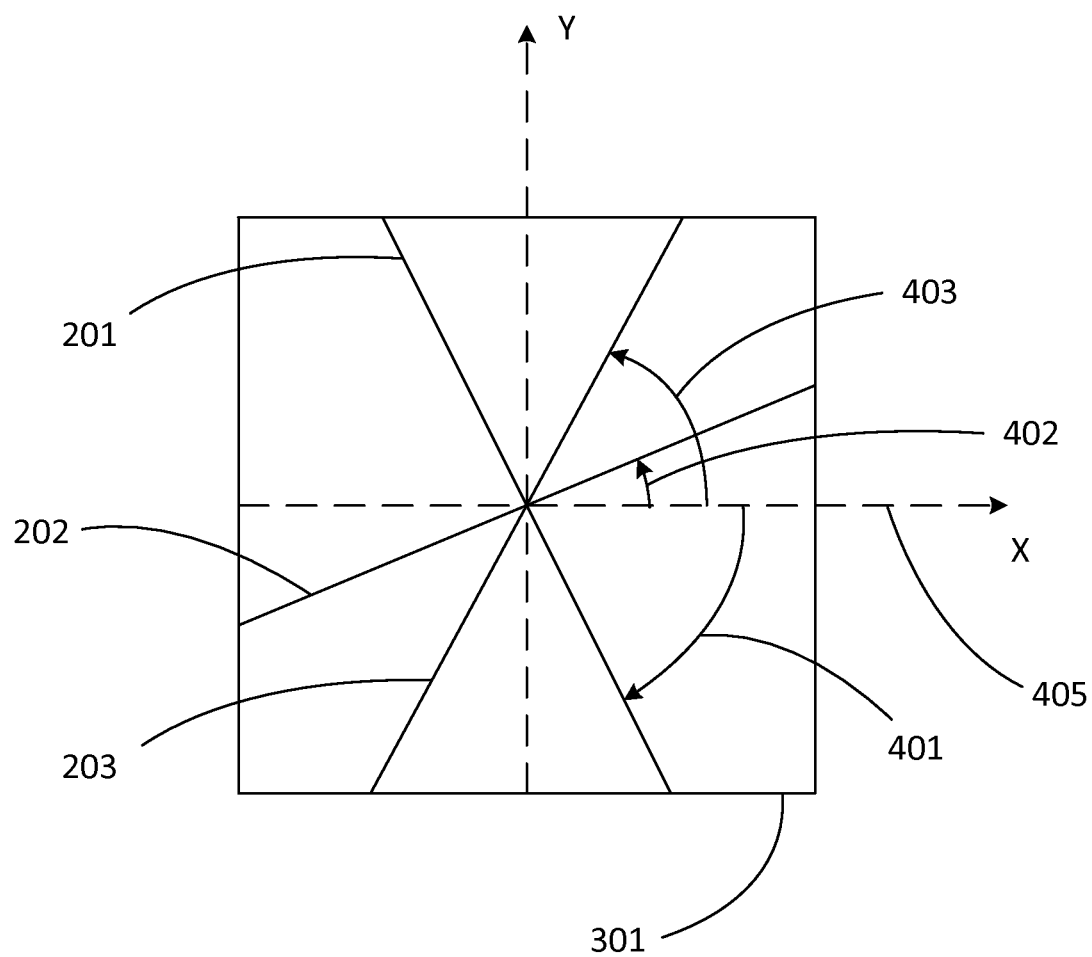
FIG. 4 is a diagram of the image sensor plane which shows how the angles of three projected dihedral lines, called the plane angles, are defined.

Although the following detailed description contains many specifics for the purposes of illustration, anyone of ordinary skill in the art will appreciate that many variations and alterations to the following details are within the scope of the invention. Accordingly, the following example embodiments of the invention are set forth without any loss of generality to, and without imposing limitations upon, the claimed invention.

An embodiment of the invention, as shown and described by the various figures and accompanying text, provides a method for measuring six degrees of freedom of a cube-corner retroreflector with a 6DOF laser tracker by measuring the position and the orientation of a cube-corner retroreflector.

Hereinafter, the term 6DOF laser tracker will be used to describe a laser tracker as described hereinabove with two added components for measuring the orientation of a cube-corner retroreflector, namely a camera and a special purpose high speed processor such as an FPGA, ASIC, DSP or other related technology.

One element of the invention is an image analysis method which is designed specifically to determine only the plane angles of three lines in an image of a cube-corner retroreflector to high precision, at high speed and with minimal probability of failure. It is called the angular power spectrum method. The motivation behind this method will now be described.

The first step is to cast the problem in a form which eliminates the need to solve for the positions of the three plane lines 201, 202 and 203, since only the three angles 401, 402 and 403 are of interest. Such a transformation should have the special property of removing position information while retaining angular information. It can be shown that the 2D discrete power spectrum, which is defined as the square of the absolute value of the 2D discrete Fourier transform, has this property. It will be noted that the 2D discrete power spectrum is just one example of a suitable transformation. Other transformations with similar properties may be substituted without altering the substance or scope of the invention.

To illustrate the removal of position information, consider the 1D Fourier transform $\hat{f}$ of a function f which is defined as:

$$\hat{f}(\xi) = \int_{-\infty}^{\infty} f(x) e^{-2\pi i x \xi} dx. \qquad \text{EQ. 1}$$

where x is the coordinate in real space and $\xi$ is the coordinate in frequency space.

Now consider a displaced function h of the form:

$$h(x) = f(x - x_0). \qquad \text{EQ. 2}$$

where $x_0$ is an arbitrary displacement. The 1D Fourier transform $\hat{h}$ of h is:

$$\hat{h}(\xi) = \int_{-\infty}^{\infty} f(x - x_0) e^{-2\pi i x \xi} dx. \qquad \text{EQ. 3}$$

Substitution and rearrangement of terms yields:

$$\hat{h}(\xi) = e^{-2\pi i x_0 \xi} \hat{f}(\xi). \qquad \text{EQ. 4}$$

Taking the square of the absolute value of both sides eliminates the exponential factor and gives the 1D power spectrum:

$$|\hat{h}(\xi)|^2 = |\hat{f}(\xi)|^2. \qquad \text{EQ. 5}$$

As can be seen, the dependence on the displacement $x_0$ has been removed: the 1D power spectrum of the displaced function h is identical to the 1D power spectrum of the un-displaced function f. This is a general result in the sense that no assumption about the form of the function was made beyond the basic assumption that its Fourier transform exists. As is well known in the field, this result applies also in two or more dimensions. It also applies to other similar transforms that involve the discrete Fourier transform (DFT), the fast Fourier transform (FFT), the sine series, the cosine series and certain others, in any number of dimensions. In general, such a transform converts a two-dimensional array of digital data into a set of coefficients of sinusoidal basis functions.

Figure 9A:
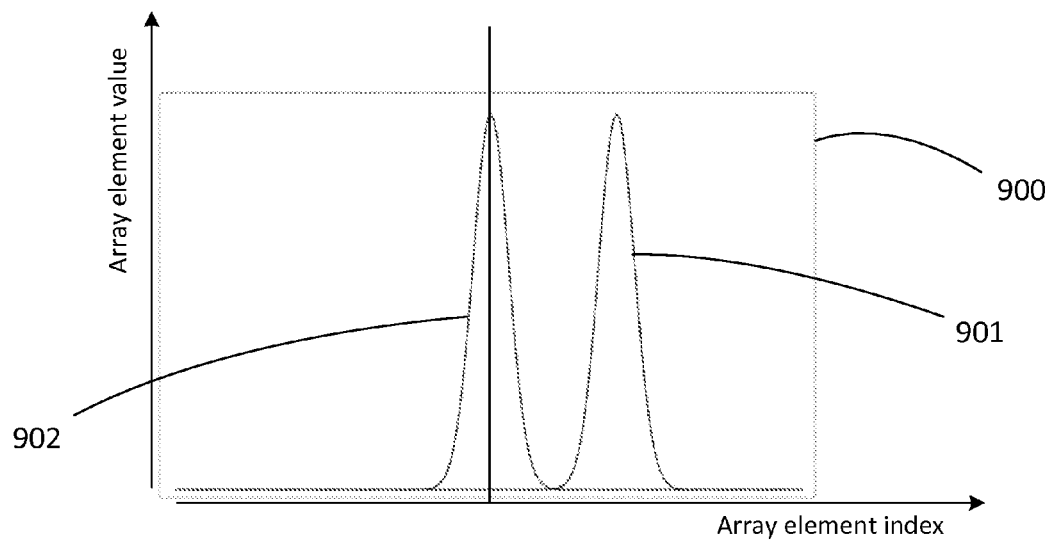
FIGS. 9A and 9B depict two plots which illustrate the removal of displacements property of the 1D discrete power spectrum.
Figure 9B:
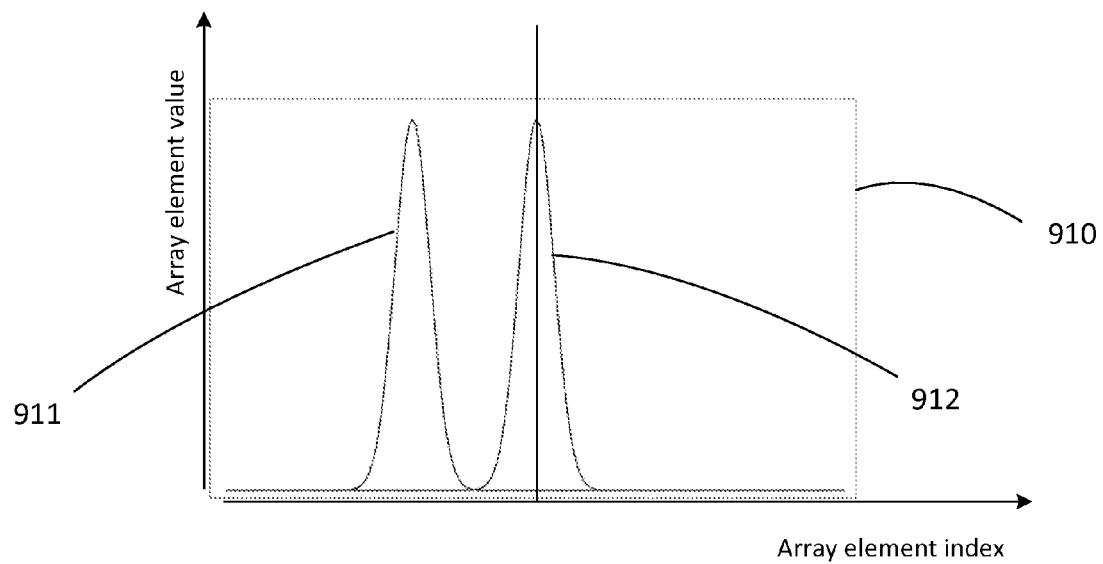

A numerical example, using the 1D discrete power spectrum, i.e. the square of the absolute value of the discrete Fourier transform (DFT) of a Gaussian function, is shown in FIGS. 9A and 9B. In plot 900, displaced function 901 is transformed into 1D discrete power spectrum 902, which is centered. Similarly, in plot 910, a differently displaced function 911 is transformed into 1D discrete power spectrum 912, which is also centered. 1D discrete power spectra 902 and 912 have the same center point.

Figure 10:
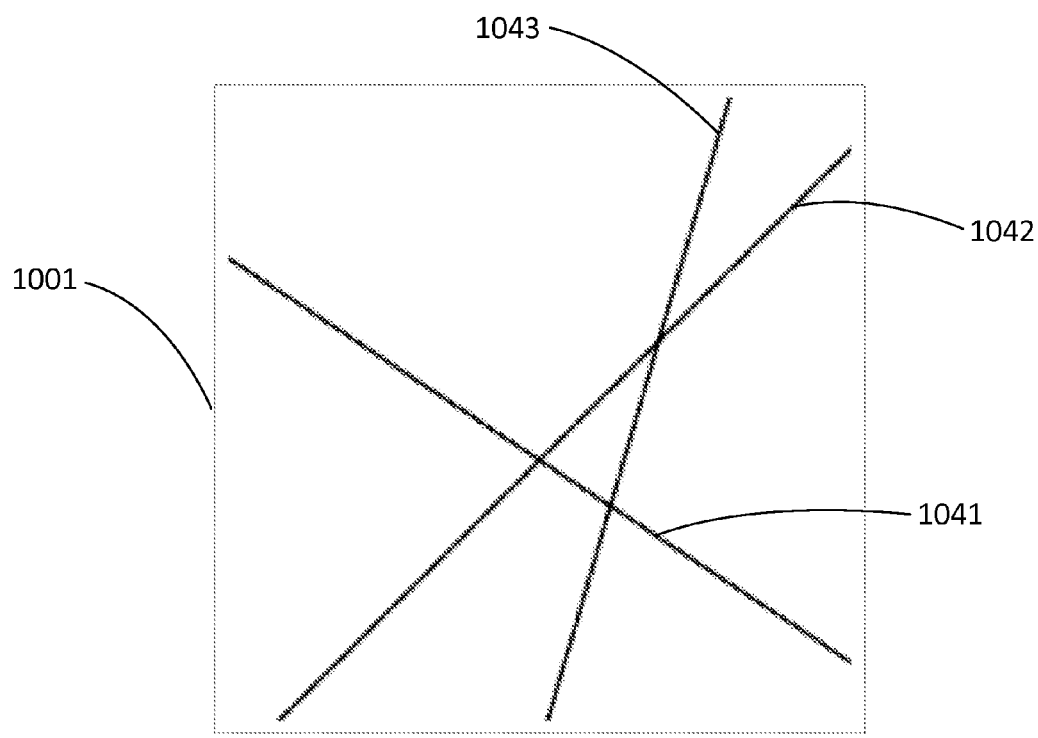
FIG. 10 depicts two images which illustrate the removal of displacements property and the preservation of angles property of the 2D discrete power spectrum, the first image being a real space image and the second image being its 2D discrete power spectrum.
Figure 10:
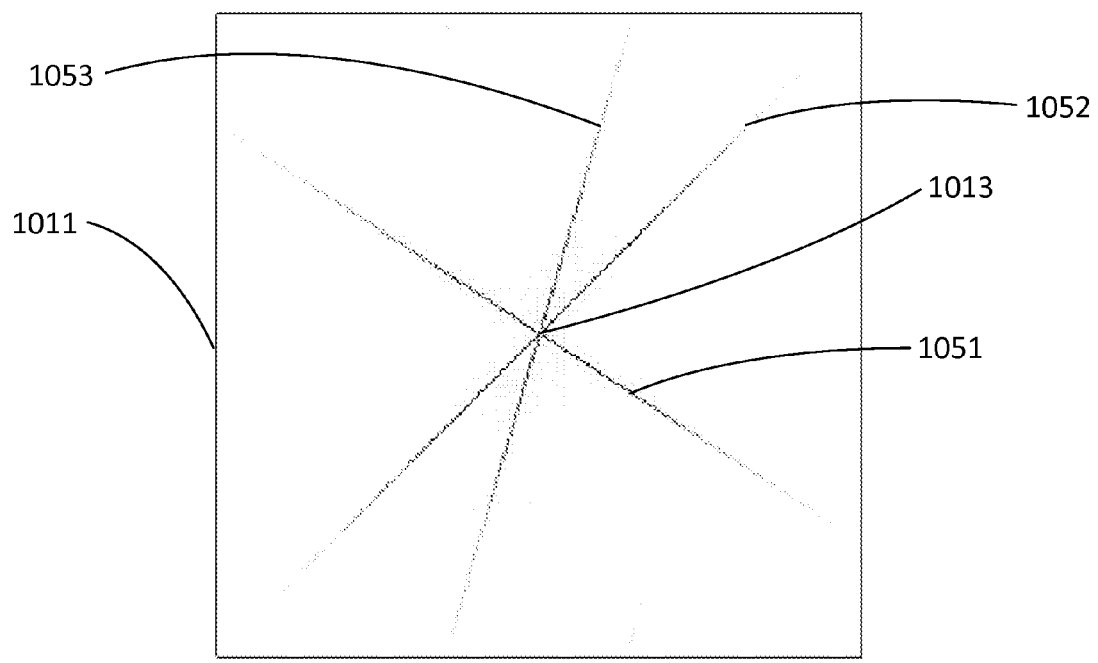

A second numerical example, this time in two dimensions, is shown in FIG. 10. Simulated image 1001 contains three plane lines 1041, 1042 and 1043 with three different angles and three different positions. The 2D discrete power spectrum 1011 of simulated image 1001, rotated 90 degrees for clarity, is also shown. The three transformed lines 1051, 1052 and 1053 now share a common intersection point 1013. Once again this follows from the removal of displacements property of the 2D discrete power spectrum. Note also that the angles of lines 1051, 1052 and 1053 are equal to the corresponding angles of lines 1041, 1042 and 1043. This illustrates that the 2D discrete power spectrum does not affect angles of lines apart from a trivial 90 degree rotation.

The 90 degree rotation property of the 2D continuous power spectrum can be understood in greater detail by considering the example of a continuous 2D Gaussian function. The function, which models a line in an image, is given in EQ 6. Consider the case of a>>b, which models a vertical line, without loss of generality.

$$f(x, y) = e^{-\pi(a^2 x^2 + b^2 y^2)} \qquad \text{EQ. 6}$$

where y is a spatial coordinate perpendicular to x and a and b are arbitrary parameters. Now it can be shown that the 2D continuous power spectrum of the function in EQ. 6 has the form:

$$\hat{f}(\xi, \zeta) = k\, e^{-2\pi\left(\frac{\xi^2}{a^2} + \frac{\zeta^2}{b^2}\right)}. \qquad \text{EQ. 7}$$

where $\xi$ and $\zeta$ are the corresponding frequency space coordinates and $k = (ab)^{-2}$.

Note that the parameters a and b have migrated to the denominator in EQ. 7. This effectively interchanges the dimensions of the line; what was the short dimension is now the long dimension, and vice-versa. The transformed line is therefore horizontal and a 90 degree rotation has taken place. This 90 degree rotation is a general result and applies to any line no matter what the angle, since the coordinate system can be rotated in an arbitrary way.

The mathematical properties of the 2D discrete power spectrum can now be summarized in the following way. First, the 2D discrete power spectrum removes positional information from the input image. In other words, all lines in the 2D discrete power spectrum share a common fixed intersection point. Second, the 2D discrete power spectrum does not affect angles of lines apart from a 90 degree rotation. This 90 degree rotation is trivial to remove, and so hereinafter when referring to the 2D discrete power spectrum it will be understood that the 90 degree rotation has been removed. These are precisely the desired properties for the application. However, it will be understood that, in an embodiment, any transformation with similar properties could be substituted for the 2D discrete power spectrum.

Figure 11:
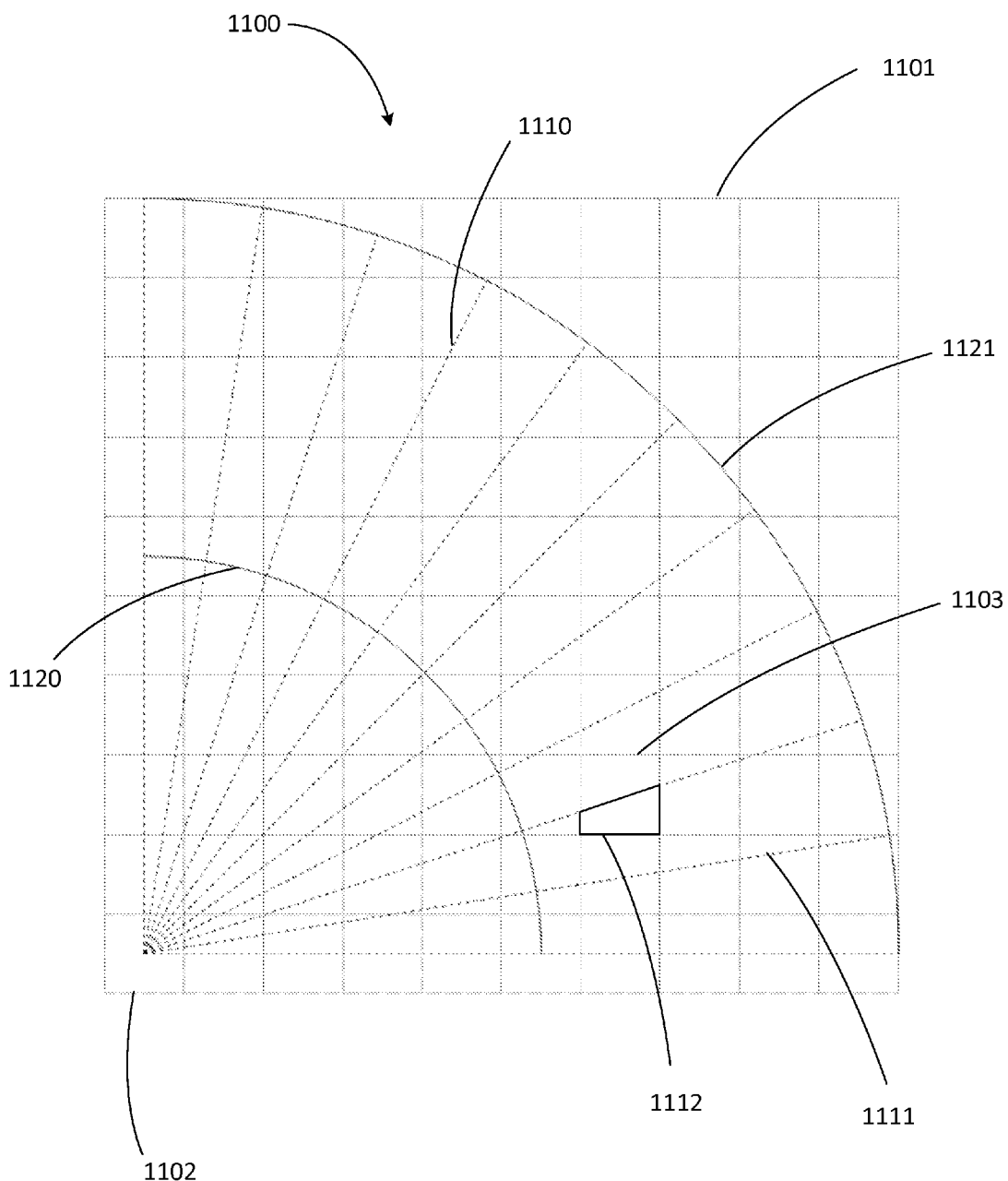
FIG. 11 depicts a diagram which illustrates how the overlap matrix A, which is used to convert a 2D discrete power spectrum into an angular power spectrum, is calculated.

Once the 2D discrete power spectrum has been computed, the next step is to extract the angular information that it contains. Note that the 2D discrete power spectrum is an array of non-negative real numbers, each number being called an element. What is needed is a method of calculating the angular content of the 2D discrete power spectrum. This can be done by a geometric method as shown in FIG. 11 which contains a diagram 1100 of the first quadrant of the 2D discrete power spectrum. The diagram includes 2D discrete power spectrum array elements 1101, and wedge-shaped angular array elements 1110 which emanate from the center of common intersection element 1102 through which all lines pass in the 2D discrete power spectrum. The contribution of the $j^{th}$ 2D discrete power spectrum array element 1103 to the $i^{th}$ angular array element 1111 is the product of overlap area $A_{ij}$ 1112 and the value $p_j$ of 2D discrete power spectrum element 1103. The value $w_i$ of the $i^{th}$ angular array element 1111 is then the sum of all such products. This can be expressed mathematically as follows in EQ 8.

$$w_i = \Sigma_{j=1}^{P} A_{ij} p_j \qquad \text{EQ. 8}$$

where P is the number of 2D discrete power spectrum array elements and i goes from 1 to the number of angular array elements. EQ. 8 is a matrix transformation which can be written in matrix notation as $$w=Ap \quad \text{EQ. 9}$$

In EQ. 9 A is called the overlap matrix, w is an array of angular element values, and p is a vector of 2D discrete power spectrum element values obtained by flattening the 2D discrete power spectrum. The array w is called the angular power spectrum of the original image.

It should be noted that if the overlap matrix A is known for the first quadrant then it is also known for the fourth quadrant by symmetry. The second and third quadrants are not needed since they are just mirror images of the first and fourth quadrants in the 2D discrete power spectrum. It should also be noted that the overlap matrix A need only be calculated once, since it is only a function of the number of 2D discrete power spectrum elements and the number of angular array elements. This provides a huge savings in the number of arithmetic operations that need to be performed in real time by the FPGA.

Referring once again to FIG. 11, one can minimize certain geometric biases in the overlap matrix A by introducing limiting circles 1120 and 1121. Overlap areas which lie outside limiting circle 1121 are excluded since they would introduce angular bias due to the square shape of the power spectrum as a whole. Overlap areas which lie inside of limiting circle 1120 are also excluded, to minimize biases caused by the square shape of the individual 2D discrete power spectrum array elements. In some cases it may be advantageous to modify the overlap matrix A in other ways to minimize these and other types of bias. It is also possible to calculate the overlap matrix A by entirely different approaches such as Bayesian statistical methods. It is understood that the content of the overlap matrix A and its method of calculation can be changed in arbitrary ways without in any way changing the substance or scope of the invention.

Figure 12:
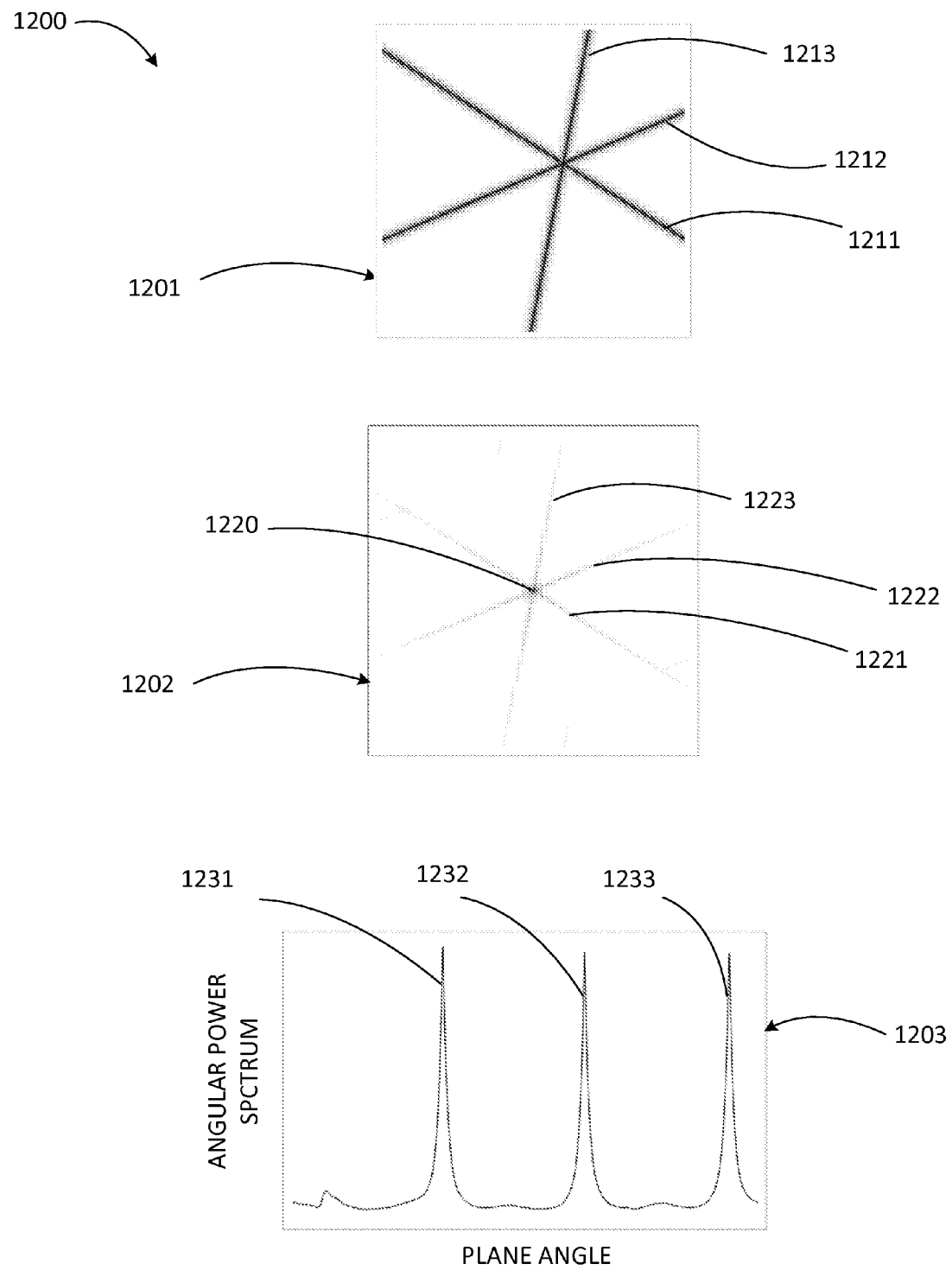
FIG. 12 depicts a sample angular power spectrum calculation showing a simulated image of a cube-corner retroreflector followed by its 2D discrete power spectrum followed by its angular power spectrum plot.

A sample angular power spectrum calculation 1200 is shown in FIG. 12. Simulated image 1201 of cube-corner retroreflector 200 contains three plane lines 1211, 1212 and 1213. The 2D discrete power spectrum 1202 of the simulated image 1201 contains three transformed lines 1221, 1222 and 1223 which intersect at the common center 1220. The result of the overlap matrix transformation in EQ. 9 is angular power spectrum 1203 with three peaks 1231, 1232 and 1233. The locations of the peaks provide a direct measure of the angles of plane lines 1211, 1212 and 1213 respectively, also called the plane angles.

Once the angular power spectrum has been calculated, the next step is to locate the three peaks 1231, 1232 and 1233. This can be done by parsing the angular power spectrum 1203 three times. On the first pass, the leftmost global maximum angular array element is found and saved. Then all angular array elements within a certain pre-determined distance of this maximum are set to zero, wrapping at the ends as necessary since the angular power spectrum is periodic. This process is then repeated two more times to obtain a total of three maxima. This process yields three array index values, which provide the approximate locations of the three peaks 1231, 1232 and 1233.

The physical constraints on the system are such that peaks in the angular power spectrum never overlap in practice. Such an overlap can only occur if the cube-corner retroreflector is tilted at an extreme angle relative to the incoming laser beam, and in this case no retroreflection occurs and the target is invisible to the 6DOF laser tracker. This same effect also prevents two peaks from ever getting closer together than a certain distance. These characteristics are useful as they reduce the probability of a false peak detection to near zero.

Figure 13:
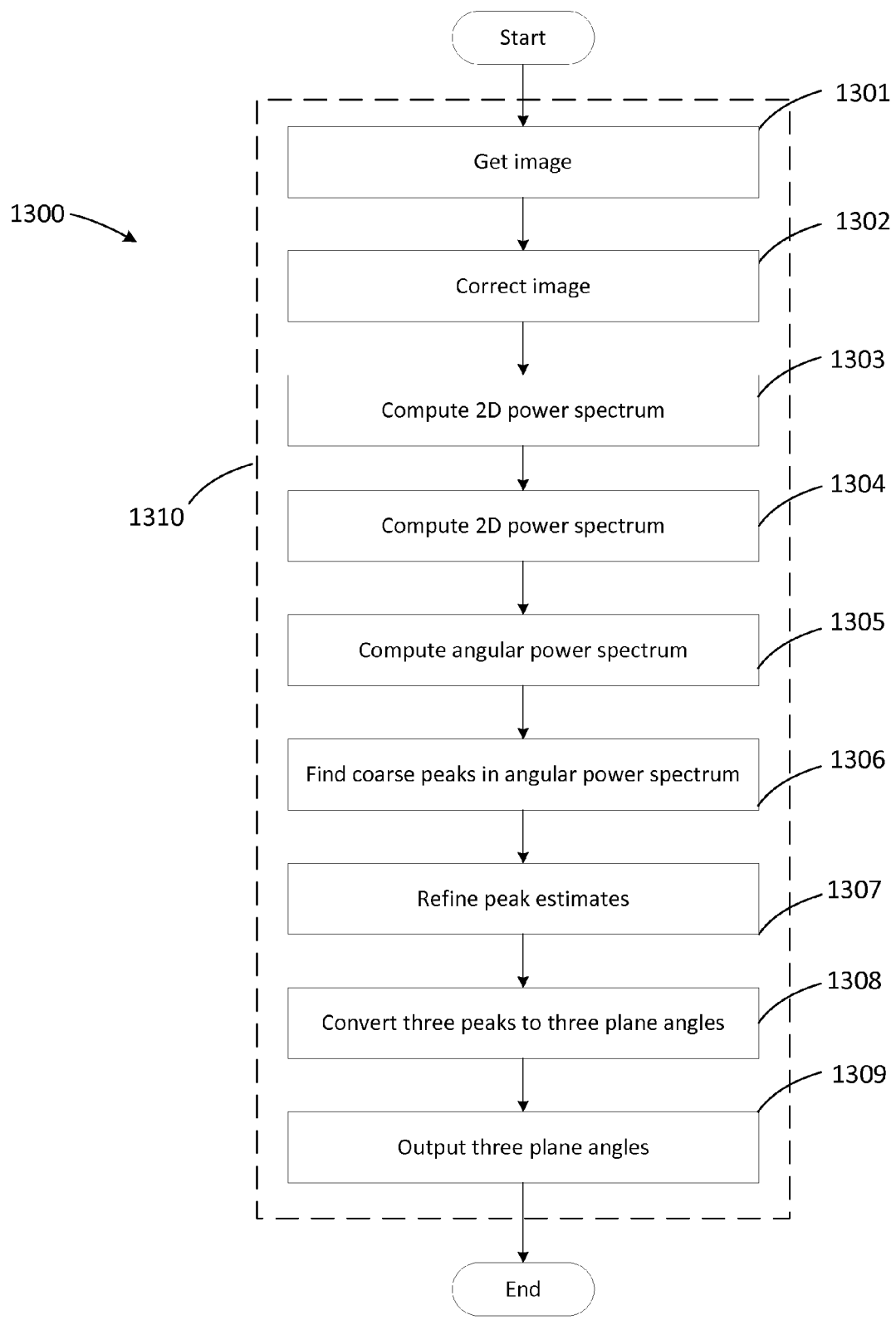
FIG. 13 depicts a flow chart which outlines at a high level the numerical processing done by the FPGA to extract the plane angles of three lines from the image of a cube-corner retroreflector using the angular power spectrum method.

The main steps in the angular power spectrum method are depicted in flow chart 1300 in FIG. 13. The following steps are performed by FPGA 1310 for each image that is collected, at a speed on the order of 100 frames per second or better. In step 1301, an image of the cube-corner retroreflector is read into FPGA 1310. In step 1302 the image is corrected as will be described in detail hereinafter. In step 1303 the 2D discrete power spectrum of the input image is computed as discussed herein above. In step 1304 an optional second 2D discrete power spectrum is computed. In step 1305, the overlap matrix A operates on the 2D power spectrum to produce the angular power spectrum. In step 1306, three approximate peaks in the angular power spectrum are found as will be described below. In optional step 1307 the three approximate peaks are refined by a least squares fitting method described in greater detail below. In step 1308, the three peaks 1231, 1232 and 1233 are converted to three plane angles. Finally, in step 1309 the measured values of the three plane angles 401, 402 and 403 are output.

To summarize, the FPGA takes an image as input and returns three plane angles; and because the mathematical operations are tailored to the FPGA architecture, this process occurs at the high speeds that are characteristic of an FPGA. Note that all operations requiring high data throughput are confined to the camera and the FPGA. The FPGA takes the data rate from on the order of 1 megapixel per frame down to three floating point numbers per frame. No special computing architecture is needed downstream of the FPGA.

Figure 16:
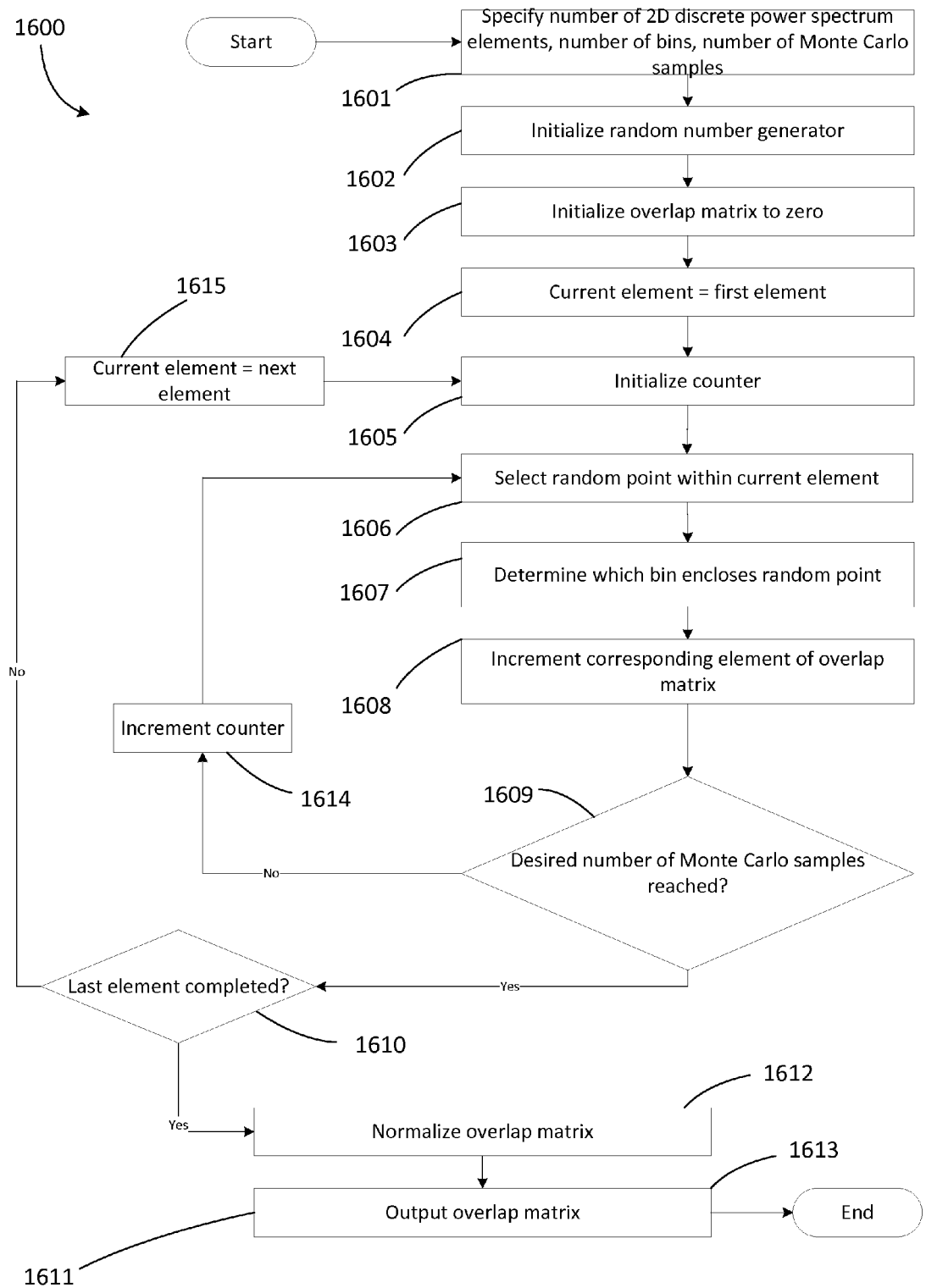
FIG. 16 depicts a flow chart which describes one way of computing the overlap matrix A which is used to transform the 2D discrete power spectrum into an angular power spectrum.

Another important element of the angular power spectrum method is the calculation of the overlap matrix A. One key reason for the high inherent speed of the angular power spectrum method is the fact that the overlap matrix A only needs to be calculated once and is then stored in the on-board memory of the FPGA. In other words, the overlap matrix A does not need to be recalculated with every new frame. There are many different ways to calculate A, and all of these ways are in accordance with the substance of the invention. What will be described now is a Monte Carlo approach. Monte Carlo is a reasonable choice for this calculation precisely because it only needs to be done once. Also, it is conceptually simple, straightforward to implement, and can be massively parallelized. The flow chart 1600 for this calculation is shown in FIG. 16. In step 1601 the number of elements in the 2D discrete power spectrum, the desired number of elements in the angular power spectrum, called bins, and the number of Monte Carlo cases per element are specified. How to arrive at reasonable values for these numbers will be described in greater detail below. Then in step 1602 the random number generator is initialized. It is set up to deliver pairs of random real numbers by sampling from a rectangular distribution with limits that correspond to the four edges of the element of interest. In step 1603 an array to hold the overlap matrix A is allocated and then initialized by setting all elements to zero. In step 1604 the current element is set to the first 2D discrete power spectrum element. In step 1605 the Monte Carlo cases counter is initialized to 1. In step 1606 a random point within the current element is selected. In step 1607, the angle subtended at the 2D discrete power spectrum center element by the random point is computed by taking the arctangent. This angle is then compared with the bounding angles of each bin until the bin which encloses the random point is found. Then in step 1608 the overlap matrix element with the corresponding element number and bin number is incremented. In step 1609 the Monte Carlo case counter is compared to the specified number of Monte Carlo cases. If the specified number has not been reached, then the counter is incremented in step 1614 and execution passes again to step 1606. It the specified number has been reached, then execution passes to step 1610 and a decision is made as to whether the last element has been analyzed. If not, then execution passes to step 1615 where the current element is incremented and then execution passes once again to step 1605. If the last element has been analyzed, then execution passes to optional step 1612 wherein the overlap matrix A is normalized. This optional step can be done for example by dividing the overlap matrix A by the specified number of cases. In fact the overall normalization is arbitrary and can be chosen for convenience, for example to optimize the arithmetic precision in the FPGA. Finally in step 1613 the overlap matrix A is output.

Figure 14:
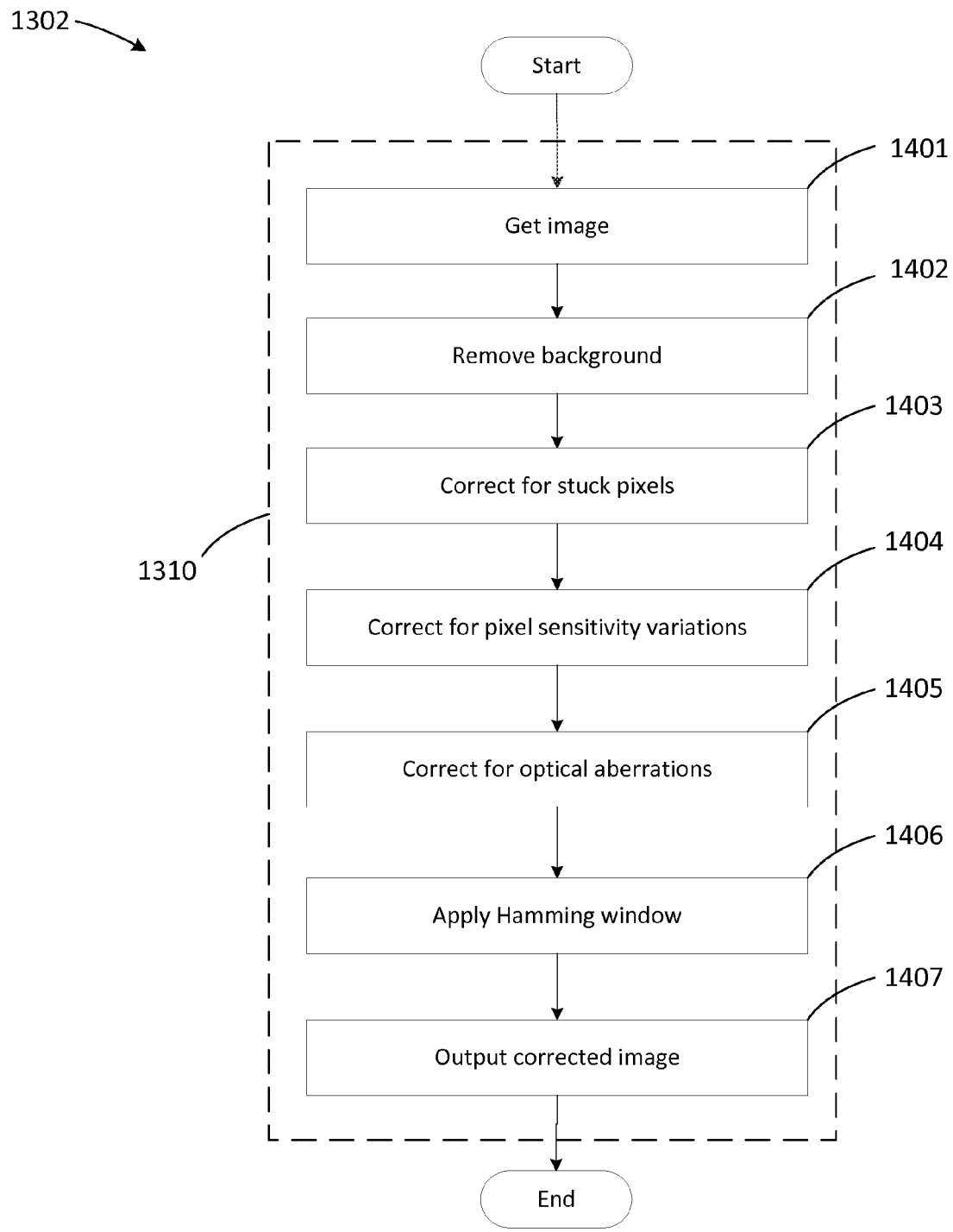
FIG. 14 depicts a flow chart which provides additional details of the image correction step 1302 in FIG. 13.

Next the image correction step 1302 of FIG. 13 is described in greater detail. A flow chart for this process is shown in FIG. 14. These steps all take place within FPGA 1310. In step 1401 the raw image is obtained from the camera. Then in step 1402 optional background removal is performed. This can be done for example by subtracting a constant amount from each pixel value, being careful to set the constant in such a way that no negative values result. In step 1403 an optional correction for stuck pixels, i.e. pixels whose values do not change due to errors in the image sensor, is applied. In step 1404 an optional scale factor is applied to each pixel to correct for sensitivity variations in the individual elements of the image sensor. Optical aberrations are optionally corrected for next, in step 1405. In step 1406 as an option a Hamming window or the equivalent is applied, to remove spurious lines which may exist at the edges of the raw image and also to eliminate aliasing. Finally in step 1407 the corrected image is output. It will be understood that different embodiments will use different corrections and will apply them in different ways without altering the substance or scope of the invention. It should also be noted that while steps 1403, 1404, 1405 and 1406, which are shown as separate steps for clarity, they may be combined and ordered in different ways without altering the substance or scope of the invention.

Figure 15:
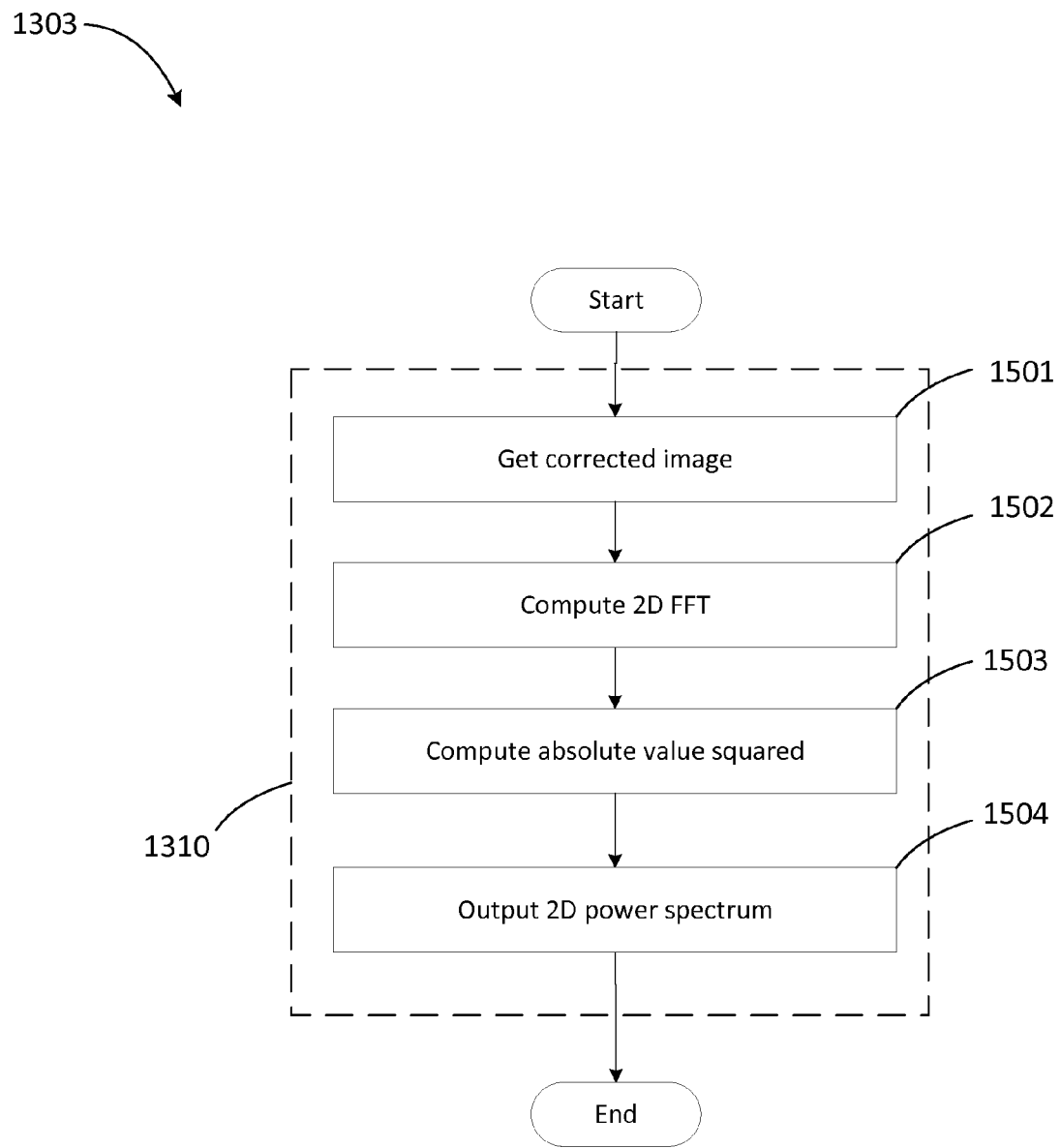
FIG. 15 depicts a flow chart which provides additional details of the compute 2D discrete power spectrum step 1303 in FIG. 13.

Step 1303 of FIG. 13 is now described in greater detail. In this step the 2D discrete power spectrum of the corrected image is computed. Referring to FIG. 15, the first step 1501 is to get the corrected image. Then in step 1502 the 2D fast Fourier transform (2D FFT) is computed. In step 1503 the square of the absolute value, of each complex element of the 2D FFT is computed to produce the 2D discrete power spectrum. Finally in step 1504 the 2D discrete power spectrum is output.

The term fast Fourier transform (FFT) was used in this description because this is typically what is used in an FPGA architecture. However, other forms of discrete Fourier transform (DFT) can also be used without altering the substance or scope of the invention.

Figure 19:
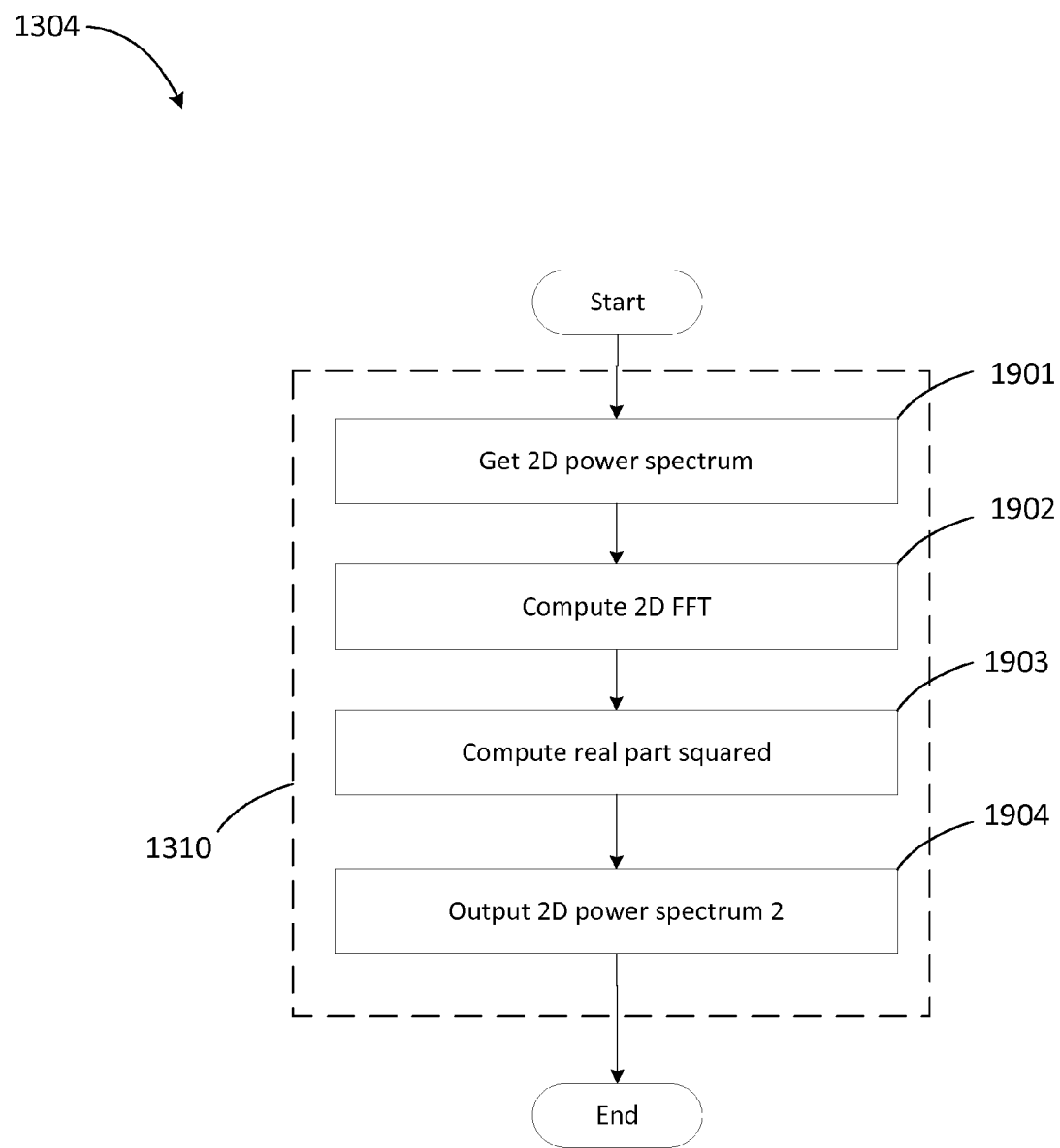
FIG. 19 depicts a flow chart which provides additional details of the optional second compute 2D discrete power spectrum step 1304 in FIG. 13.

Next, in FIG. 13 step 1304 an optional second 2D discrete power spectrum is applied. This can be useful in cases where spurious lines due to diffraction effects exist in the input image. The flow chart for this step is shown in FIG. 19. In step 1901 the 2D discrete power spectrum from the previous step, FIG. 13 step 1303, is read in. Then in step 1902 the 2D FFT is computed. Then in step 1903, the real part of the 2D FFT is taken and squared. This is equal to the desired absolute value squared because the imaginary part of the 2D FFT of the first 2D discrete power spectrum is always zero. Of course the absolute value squared can also be computed in the standard manner if there is some advantage in doing so. Finally in step 1904 the second 2D power spectrum is output. Note that there is no advantage in iterating the power spectrum further as the sequence then begins to repeat.

In FIG. 13 step 1305 the angular power spectrum is computed. As described above, this can be thought of as taking the product of the overlap matrix A and a vector of 2D discrete power spectrum element values. The overlap matrix A is a large matrix but is also sparse, and therefore presents no undue data storage requirements. In addition, data storage space can be saved by taking advantage of certain symmetries. For example, the right/left symmetry of the 2D discrete power spectrum means that only the right side of the 2D discrete power spectrum is needed. This halves the storage size of the overlap matrix A and the final 2D discrete power spectrum. Also, each element of the overlap matrix A has a mirror image on the other side of the horizontal (X) axis. Also in an embodiment there is symmetry about the 45 degree line. Different embodiments will offer different symmetries that can be exploited to reduce data storage requirements.

Figure 30:
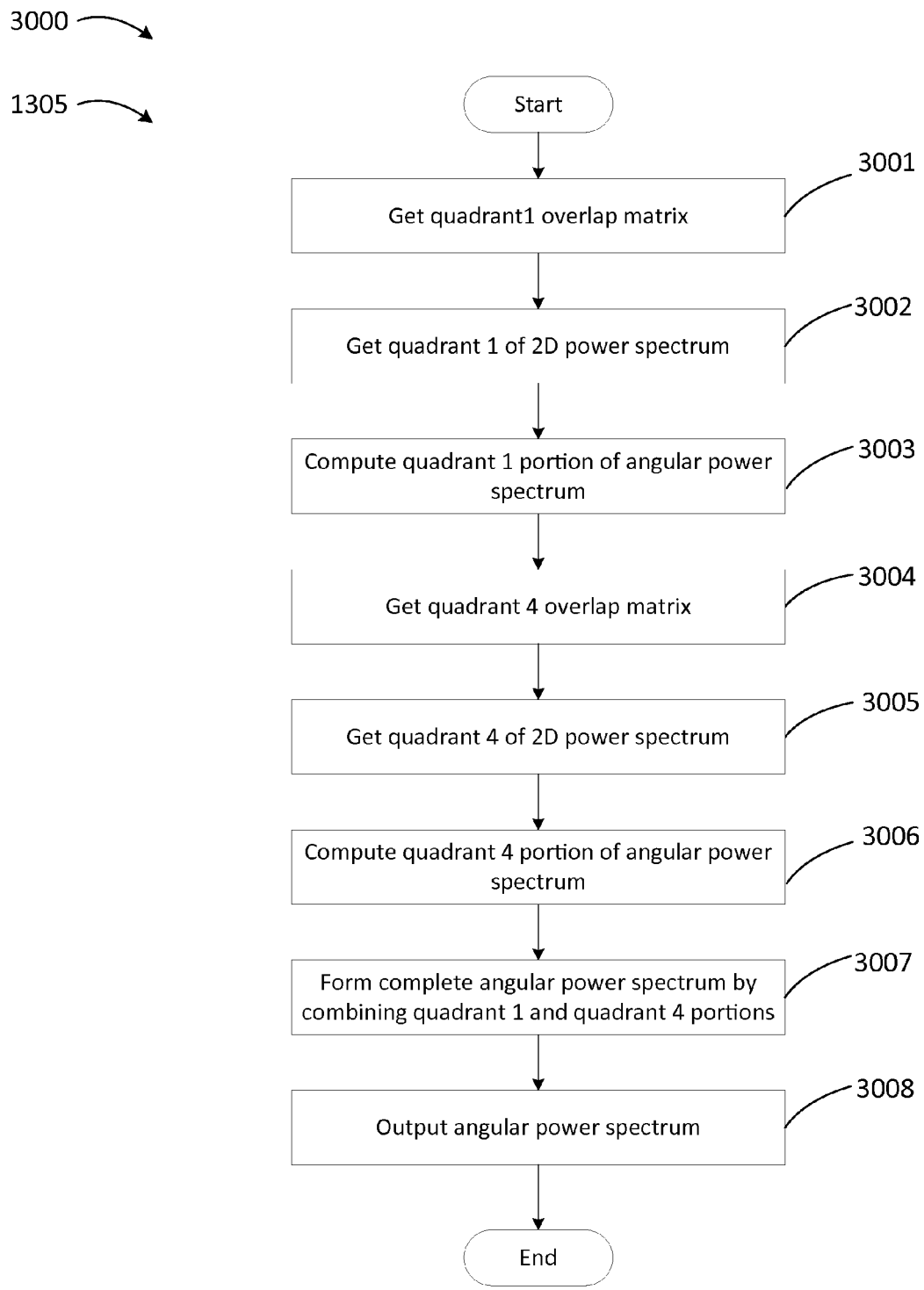
FIG. 30 depicts a flow chart which provides additional details of the calculation of the angular power spectrum step 1305 in FIG. 13.

An example embodiment of step 1305 is depicted in the flow chart 3000 in FIG. 30. In step 3001 the quadrant 1 portion of the overlap matrix A is obtained; then in step 3002 the quadrant 1 portion of the 2D discrete power spectrum is obtained; and in step 3003 the quadrant 1 portion of the angular power spectrum is computed. In step 3004 the quadrant 4 portion of the overlap matrix A is obtained; then in step 3005 the quadrant 4 portion of the 2D power spectrum is obtained; and in step 3006 the quadrant 4 portion of the angular power spectrum is computed. Then in step 3007 the complete angular power spectrum is formed by combining the quadrant 1 and quadrant 4 portions. Finally in step 3008 the angular power spectrum is output. Note that the quadrant 4 overlap matrix is related to the quadrant 1 overlap matrix by a reflection about the X axis and so there is no need to allocate separate storage for the quadrant 4 overlap matrix.

Figure 18:
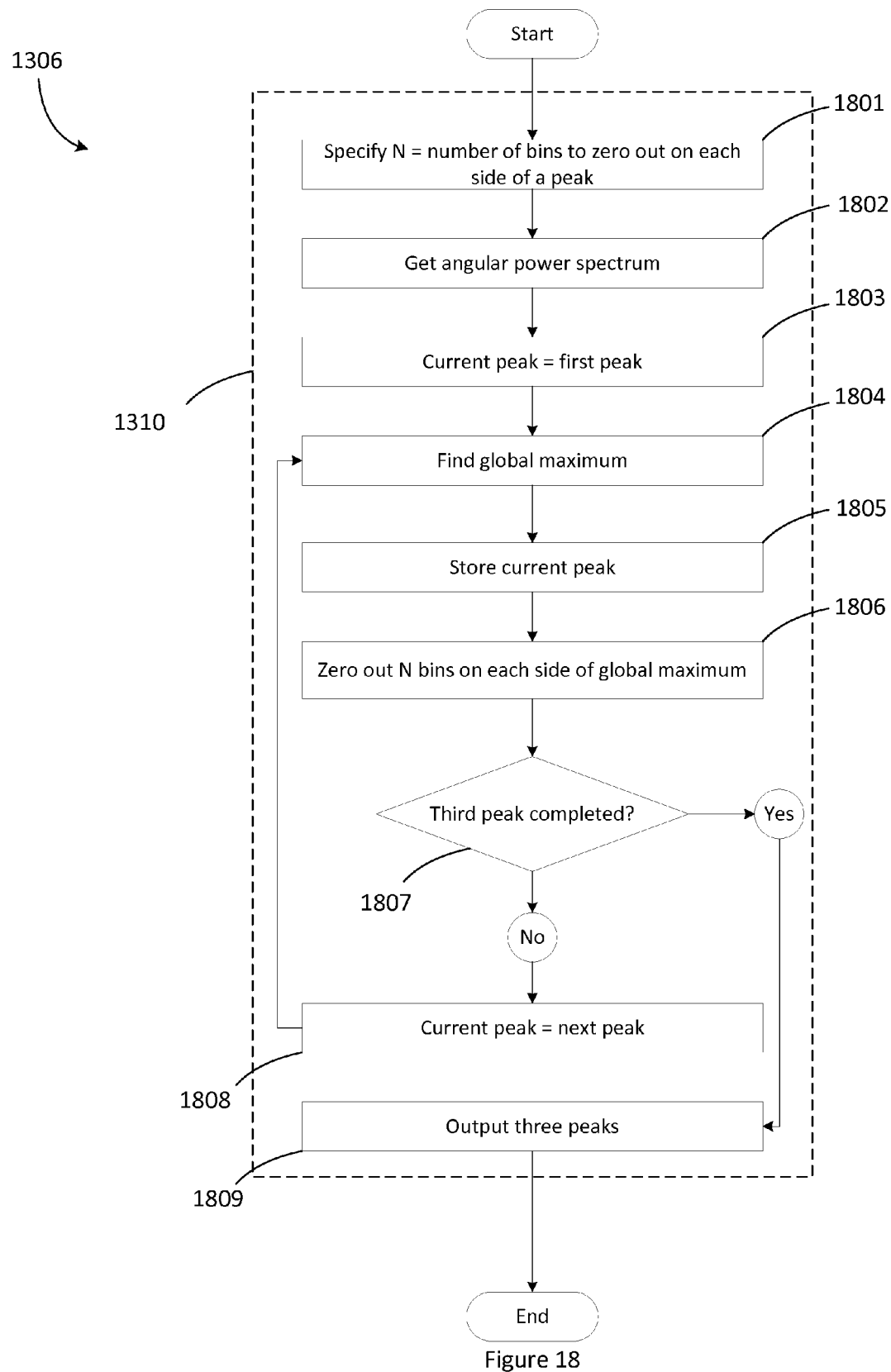
FIG. 18 depicts a flow chart which provides additional details of step 1306 in FIG. 13, in which coarse estimates of the three peaks in the angular power spectrum are computed.

In the next step 1306 of FIG. 13, the three peaks in the angular power spectrum are located. The flow chart for this process is shown in FIG. 18. In step 1801 the buffer zone size is specified. The purpose of the buffer zone is to assure that small subsidiary fluctuations near the true peaks in the angular power spectrum do not result in detected peaks that are closer together than is physically possible. In step 1802, the angular power spectrum is obtained. In step 1803 the current peak counter is set to one, and in step 1804 the global maximum is found and assigned to the current peak. In step 1805 the current peak is stored, and in step 1806 elements of the angular power spectrum that are within the current peak's buffer zone are set to zero. In step 1807, the peak counter is compared with 3. If the third peak has not yet been processed, then execution passes to step 1808 where the peak counter in incremented and execution returns to step 1804. If the third peak has been processed, then execution passes to step 1809 and the three peaks are output. Note that no two peaks can ever be closer than some rather large angle on the order of 0.1 radians, since this would indicate that the retroreflector is tilted at such a large angle relative to the incoming laser beam that retroreflection no longer occurs. Note also that the process in FIG. 18 produces a coarse estimate of the peaks whose resolution is equal to the width in radians of a single bin.

Figure 17:
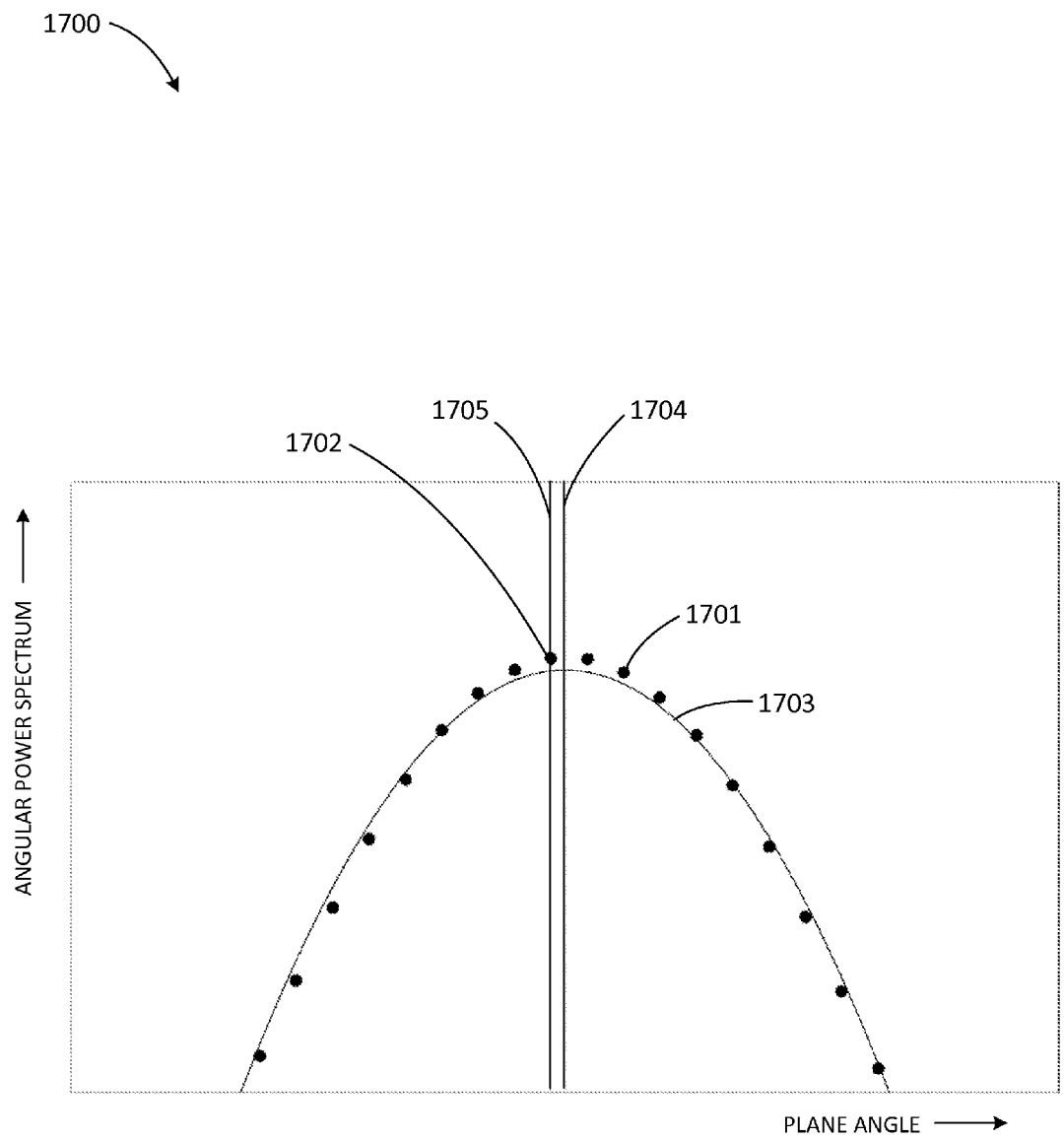
FIG. 17 depicts a plot of a portion of a typical angular power spectrum that lies near a peak, illustrating the use of a parabolic least squares fit to improve the angular resolution of the solution for the peak.
Figure 20:
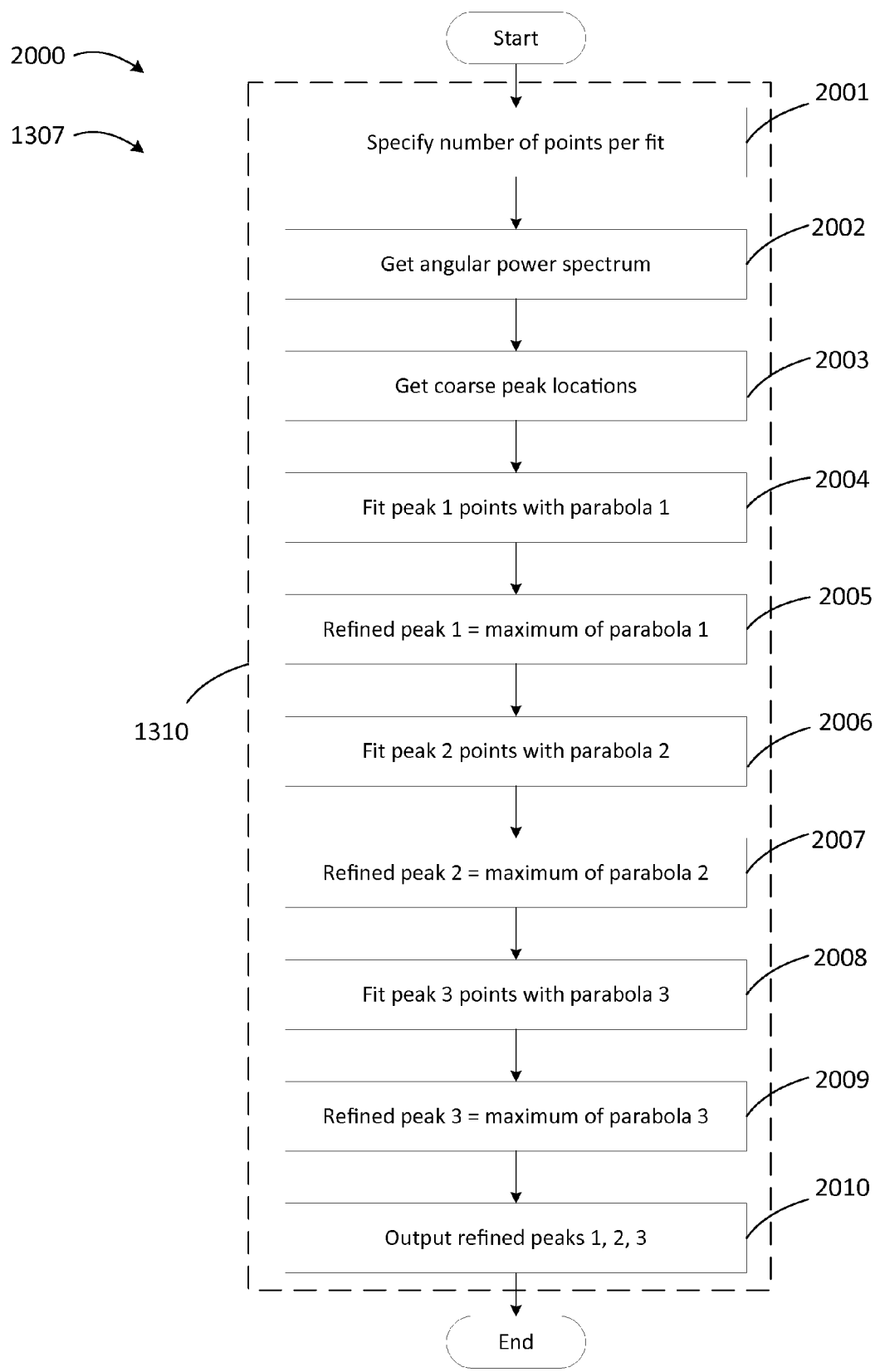
FIG. 20 depicts a flow chart which provides additional details of step 1307 in FIG. 13 in which three coarse estimates of the peaks 1231, 1232 and 1233 in angular power spectrum 1203 are refined by means of least squares parabolic fits.

Step 1307 of FIG. 13 is now described in greater detail. FIG. 17 shows a section of a typical angular power spectrum 1700 that lies in the neighborhood of a peak. Each point 1701 represents the value of a particular bin, and point 1702 is the maximum bin value. A higher resolution estimate of the peak, and therefore a higher resolution estimate of the corresponding plane angle, can be obtained by fitting the points 1701 with parabola 1703 by a least squares technique. Maximum 1704 of the parabola provides a higher resolution estimate of the true peak than the peak bin value 1705. The parabolic fit method is fast, robust, accurate, and requires no initial estimate of the peak. These characteristics facilitate an FPGA implementation. However, any other method can be substituted without altering the substance or scope of the invention. A flow chart 2000 for the process 1307 is shown in FIG. 20. First in step 2001 the number of points per fit is specified. This should be large enough to obtain an accurate fit but not so large that non-quadratic behavior is observed. Then in step 2002 the angular power spectrum is obtained, and in step 2003 the previously calculated coarse peak locations are obtained. In step 2004 the points in the neighborhood of peak 1 are fitted with parabola 1, and in step 2005 the maximum of parabola 1, which is the refined estimate of plane angle 1, is calculated. Then in step 2006 the points in the neighborhood of peak 2 are fitted with parabola 2, and in step 2007 the maximum of parabola 2, which is the refined estimate of plane angle 2, is calculated. Then in step 2008 the points in the neighborhood of peak 3 are fitted with parabola 3, and in step 2009 the maximum of parabola 3, which is the refined estimate of plane angle 3, is calculated. Finally in step 2010 peaks 1, 2 and 3, which are the refined estimates of the three plane angles, are output.

Another approach to refining the peaks is the midpoint method, which works as follows. [a] Place the peak bin of interest and its neighboring points into an array; [b] fit the array with a suitable function or alternatively construct an interpolating function; [c] draw a horizontal line through the function (the horizontal line intersects the function twice, once on each side of the true peak); [d] calculate the two intersection points; [e] calculate the midpoint by averaging the two intersections together; [f] repeat steps c through e as desired; and, [g] compute the mean or median of all the midpoints. This method may be useful when significant discretization effects such as pixelization are present.

Another method of minimizing pixelization and other discretization effects is called the multiple parabola method, as follows. [a] Place the beak bin of interest and its neighboring points into an array; [b] divide the array into a series of subsets; [c] fit each subset with a parabola and compute the peak of each; and, [d] compute the median of all the parabola peaks. It is noted that the point subsets can overlap for certain applications. The method of refining the peaks can be varied as desired without altering the substance or scope of the invention.

Figure 6:
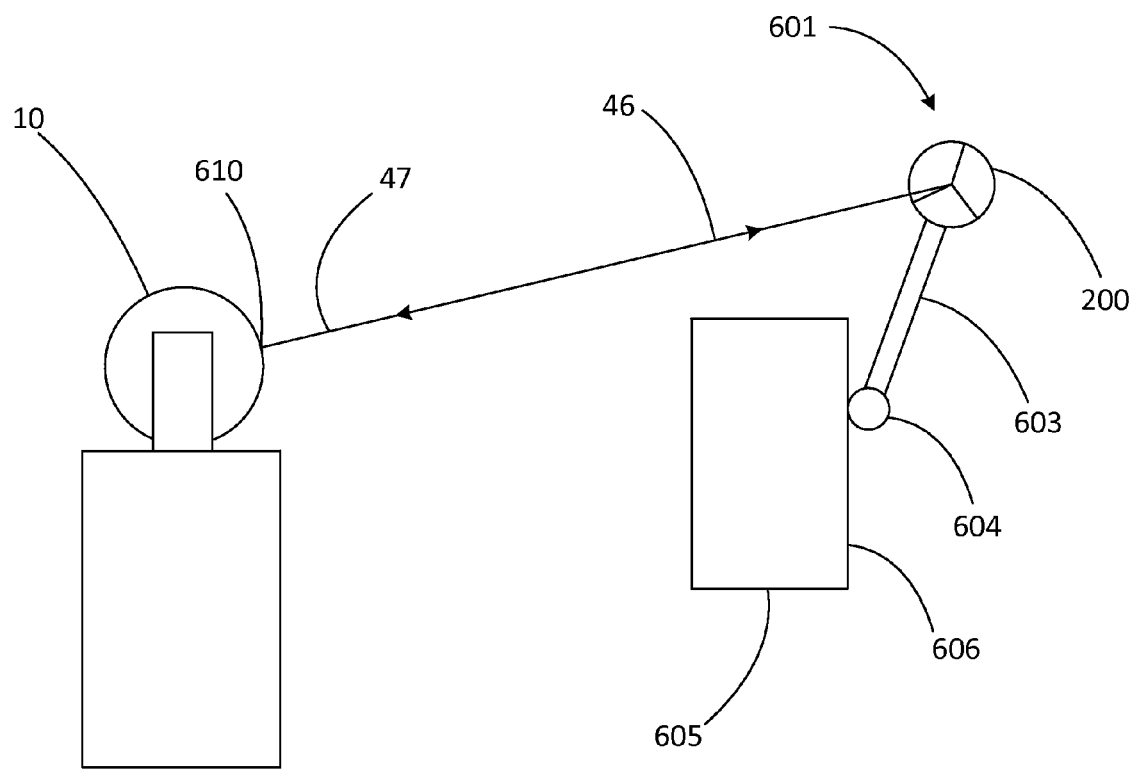
FIG. 6 is a diagram of a hidden surface being measured with a 6DOF-capable laser tracker with the aid of a 6DOF probe, according to an embodiment of the invention.

This concludes the detailed description of the processing that is performed by FPGA 1310 shown in FIG. 13. Next, certain further example embodiments of the invention will be described. The first of these is shown in FIG. 6 and the associated flow chart in FIG. 21. Referring to FIG. 6, the embodiment involves the measurement of hidden surface 606 on part 605 by 6DOF laser tracker 10. This is made possible by 6DOF probe 601 which comprises cube-corner retroreflector 200, shaft 603 and spherical probe tip 604.

Figure 7:
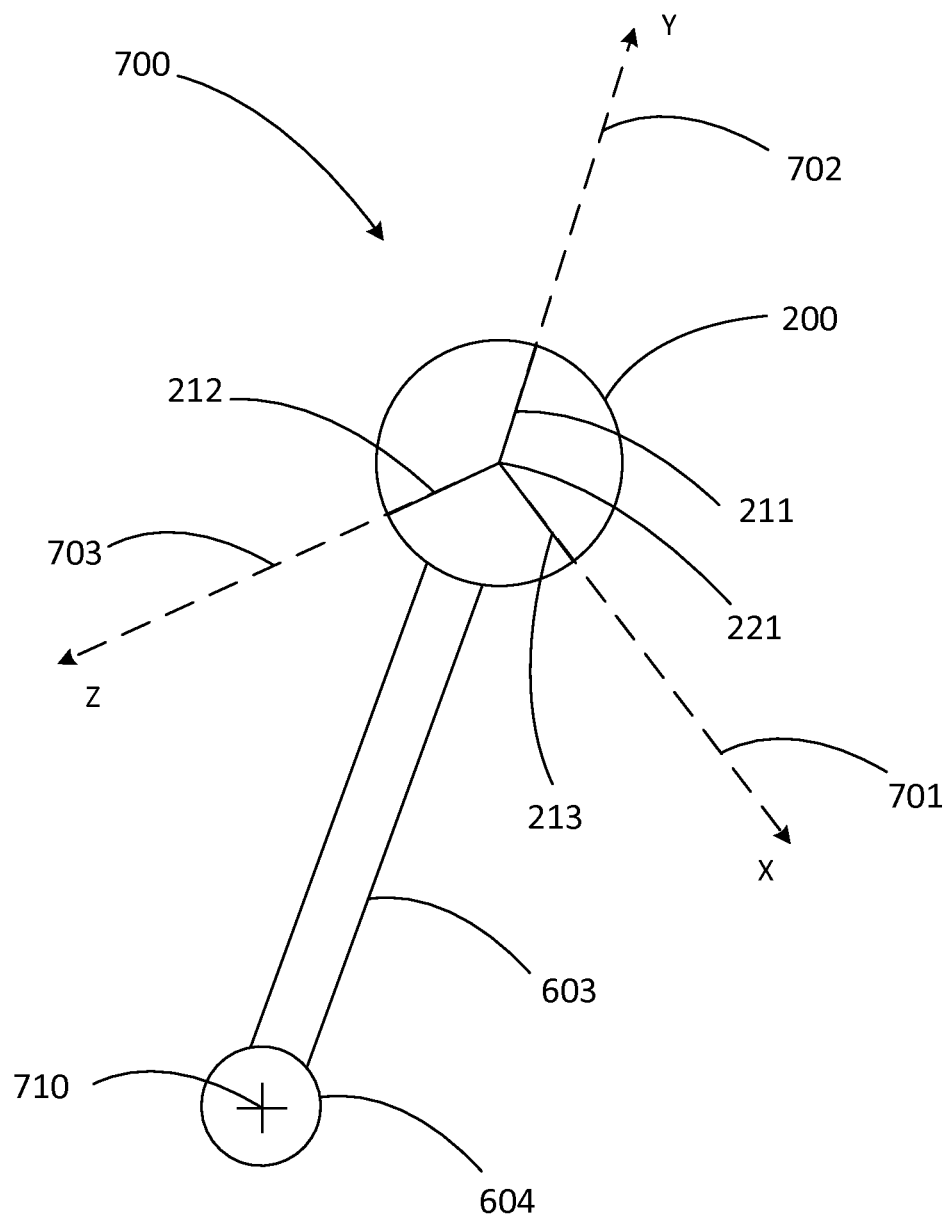
FIG. 7 is a diagram of a 6DOF probe comprising a cube-corner retroreflector, shaft and spherical tip, according to an embodiment of the invention.

FIG. 7 shows details of a 6DOF probe 700 that includes many elements of the 6DOF probe 601 of FIG. 6. The 6DOF probe 700 includes a probe tip 604 having a spherical contact surface with a center 710. Probe 700 includes a shaft 603 that connects the probe tip 604 to the cube-corner retroreflector 200. The cube-corner retroreflector includes three planar reflecting surfaces that intersect in three dihedral lines 211, 212, and 213, also referred to as intersection lines 211, 212, and 213. The intersection lines 213, 211, and 212 coincide with the x axis 701, y axis 702, and z axis 703, respectively. These axes are defined in a frame of reference of the cube-corner retroreflector 200.

Figure 31:
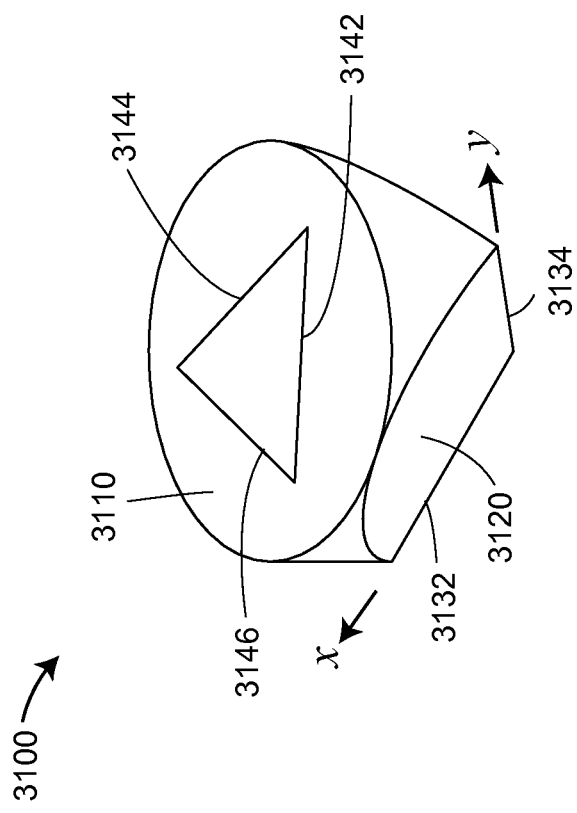
FIG. 31 depicts an orthographic view of a cube-corner glass prism that includes one or more straight marks according to an embodiment of the invention.

In an embodiment, the cube-corner retroreflector is a hollow retroreflector having three reflecting surfaces. Such a retroreflector is sometimes referred to as a hollow cube-corner retroreflector. In another embodiment, the cube-corner retroreflector is a glass prism having three mutually perpendicular planar reflecting surfaces and a front face. FIG. 31 shows an example of a glass cube-corner prism 3100. The retroreflector 3100 includes a front face 3110 and three mutually perpendicular surfaces, one of which is shown as 3120. The three reflecting surface intersect in three intersection lines, one of which is 3132 coinciding with an x axis and another of which is 3134 coinciding with a y axis. In an embodiment, one or more straight marks 3142, 3144, 3146 are placed on the front face 3110 of the glass prism. The mathematical methods described herein may be used to determine the angles of the one or more lines and these determined angles applied in a fitting method to determine the orientation of the retroreflector 3100 using mathematical methods described herein.

In an embodiment the angles between each of the three straight marks are defined, i.e., known angles. In another embodiment the angles between each of the three straight marks are equal to one another. In another embodiment the three straight marks form an equilateral triangle.

Figure 21:
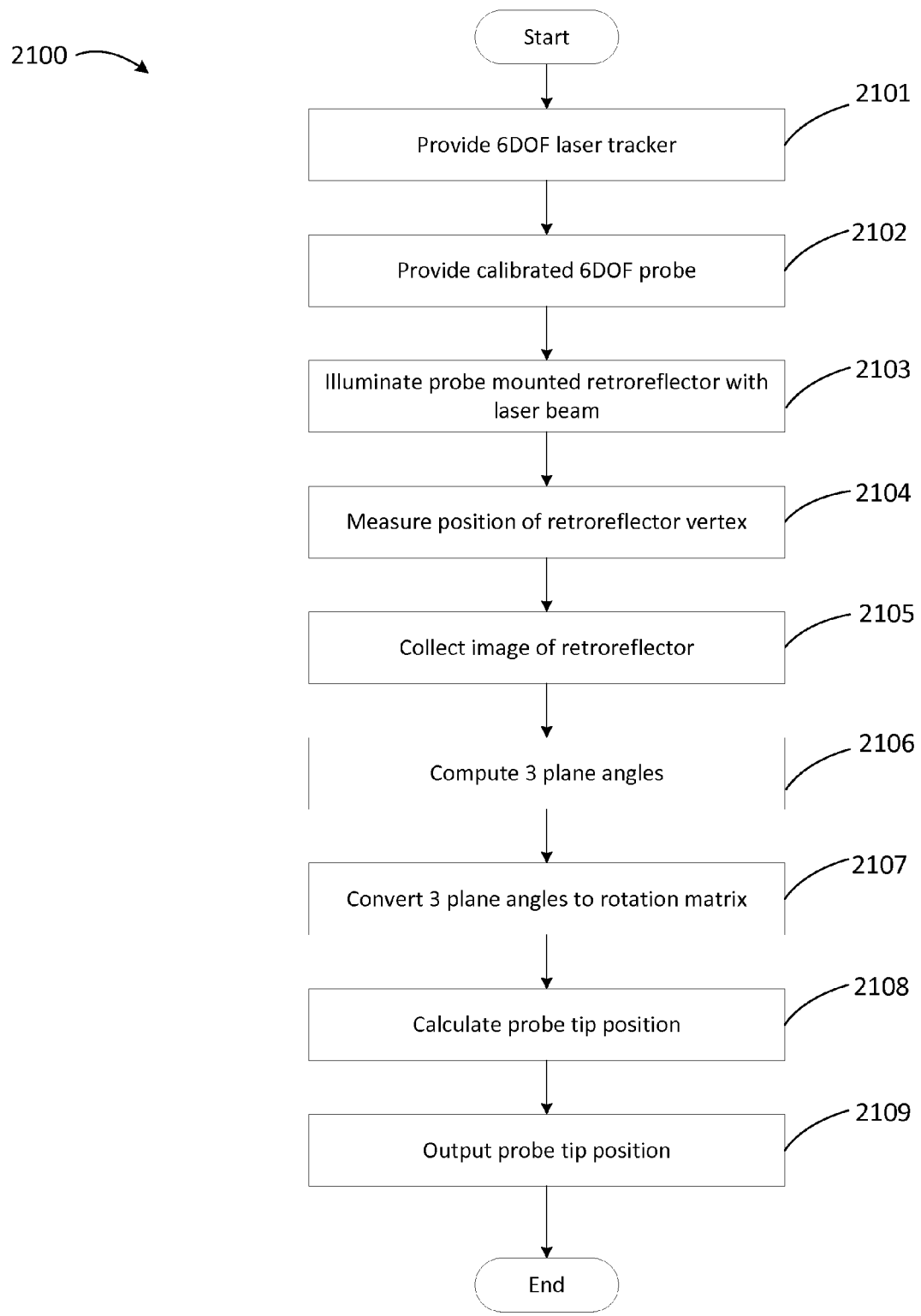
FIG. 21 depicts a flow chart which illustrates the steps in measuring a surface which may be hidden with a 6DOF-capable laser tracker and a 6DOF probe, according to an embodiment of the invention.

The steps in the method are given in flow chart 2100 in FIG. 21. First in step 2101 a 6DOF laser tracker 10, i.e. a laser tracker equipped with a special purpose camera and an FPGA, is provided. Then in step 2102 a calibrated 6DOF probe 200 is also provided. In step 2103 the probe-mounted retroreflector is illuminated by laser beam 46. Then in step 2104 a portion of the return beam 47 is used to measure the position of the retroreflector vertex. Another portion of the return beam 47 is used by the camera in step 2105 to collect an image of the cube-corner retroreflector. In step 2106, FPGA 1310 is used to convert the image into three plane angles. These are the angles of the three dihedral lines of the retroreflector after they have been projected onto the plane of the camera's internal sensor. In step 2107 the plane angles are converted to a rotation matrix. In step 2108 the probe tip position is calculate. Finally in step 2109 the probe tip position is output.

Step 2102 of flow chart 2100 in FIG. 21 is now described in greater detail. A calibrated 6DOF probe is a probe which has been measured in advance, either at the factory or by the user, before use in actual metrology applications. More specifically it is a probe whose spherical tip coordinates are known relative to the local coordinate frame of the probe. A natural way to define the probe frame of reference is with respect to the three dihedral lines of the cube-corner retroreflector. In other words, the origin of the probe frame of reference is the vertex of the retroreflector, and the X, Y and Z axes are defined to coincide with the cube-corner's three dihedral lines. Calibration is then the determination of the coordinates of the center of the spherical probe tip within this frame of reference. The probe frame of reference is sometimes also called the cube frame, since it is defined by the cube-corner.

Figure 25:
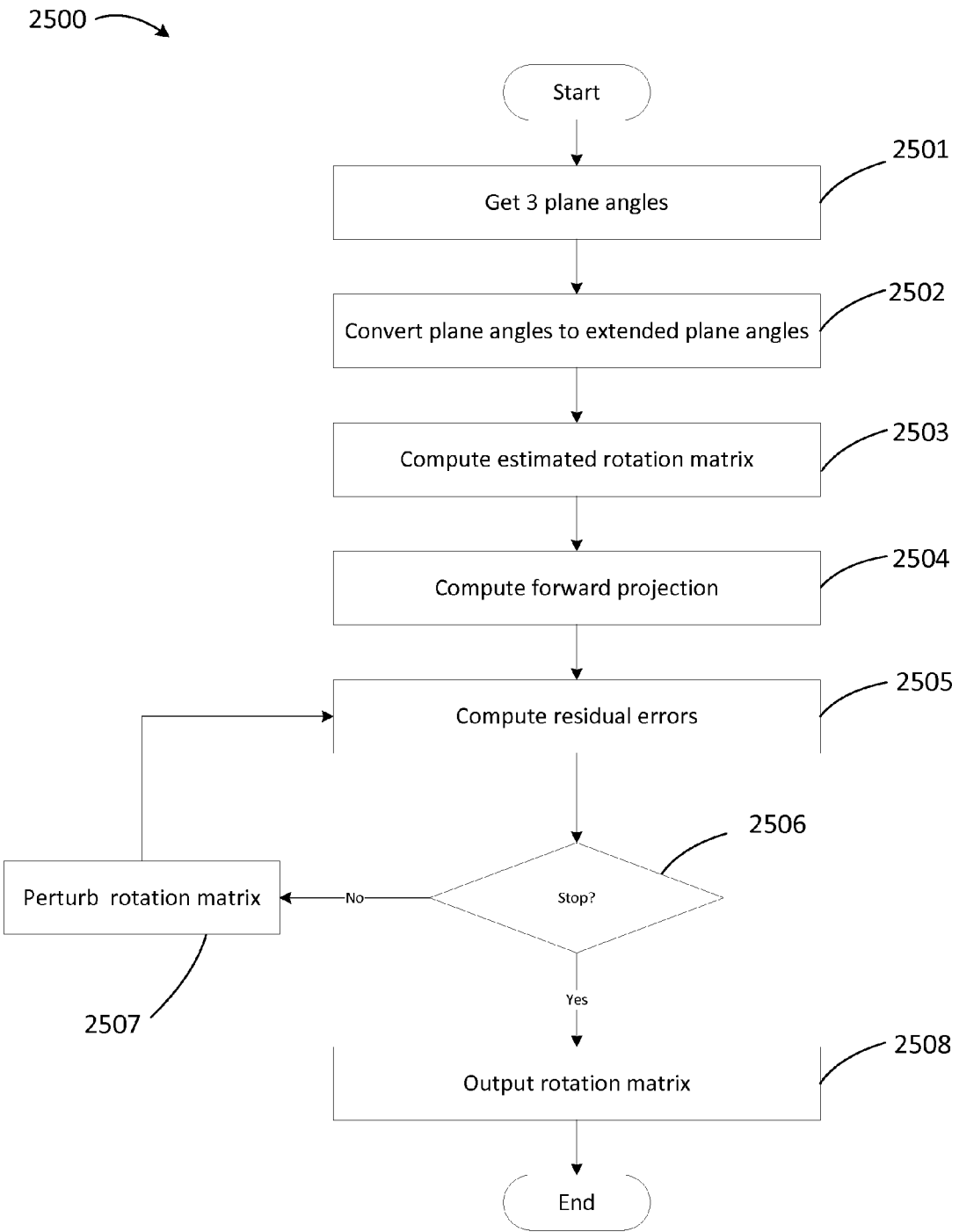
FIG. 25 depicts a flow chart which illustrates the steps in computing the rotation matrix from the three plane angles, according to an embodiment of the invention.

Step 2107 of FIG. 21 is now discussed in greater detail. This type of calculation, in which 3 plane angles are used to compute the rotation matrix, is called a back projection calculation. There are many different ways to perform the back projection, all of which are consistent with the substance of the invention. One method is shown in diagram 2500 in FIG. 25. In step 2501 the three plane angles are obtained from the FPGA. In step 2502 the 180 degree ambiguity in the line angles is removed by converting plane angles to extended plane angles. Then in step 2503 an estimate of the rotation matrix based on orthogonal projection is computed, or alternatively the result from the previous frame is retrieved. The forward projection calculation is then performed in step 2504 and the expected plane angles are computed, and then the residual errors in step 2505, i.e. the differences between the computed plane angles and the measured plane angles, are calculated. In step 2506 the magnitudes of the residual errors are evaluated to determine whether the current rotation matrix estimate is sufficiently accurate. If not, execution passes to step 2507 where the estimated rotation matrix is perturbed slightly, and then execution passes to step 2505 once again. Alternatively, if the current estimated rotation matrix meets the accuracy criterion, then execution passes to step 2508 and the rotation matrix is output.

Figure 26:
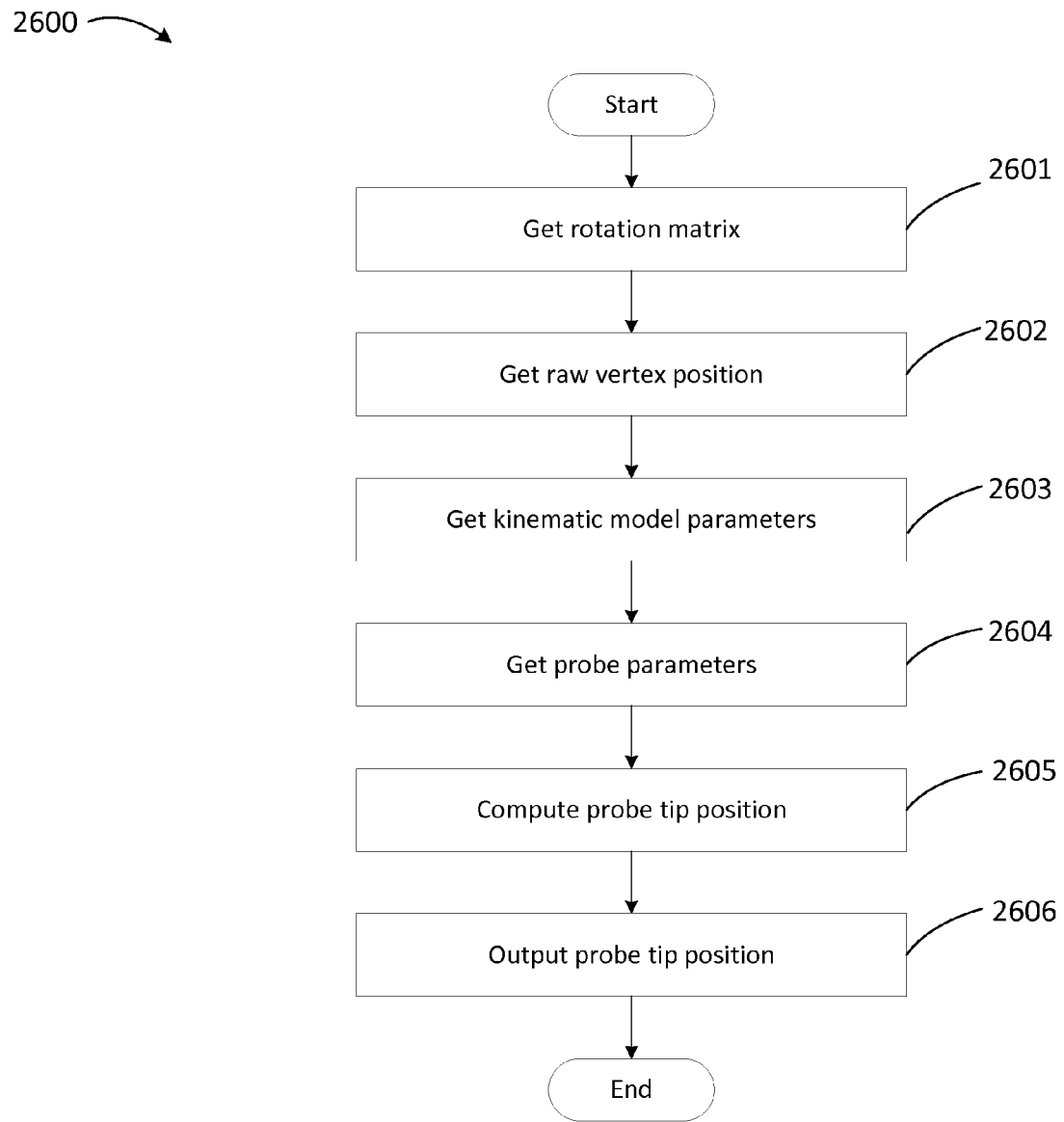
FIG. 26 depicts a flow chart which illustrates the steps in computing the position of the spherical tip of a 6DOF probe, according to an embodiment of the invention.

Next, step 2108 in FIG. 21, calculate the probe tip position, is described in greater detail. Referencing flow chart 2600 in FIG. 26, in step 2601 the rotation matrix of the retroreflector is obtained. Then in step 2602 the vertex position is obtained. In step 2603, the kinematic model parameters of the tracker are obtained. In step 2604 the probe parameters, i.e. the position of the probe tip relative to the cube frame, are obtained. Then in step 2605 the position of the probe tip relative to the tracker frame of reference is calculated. Finally in step 2606 the probe tip position is output.

Figure 22:
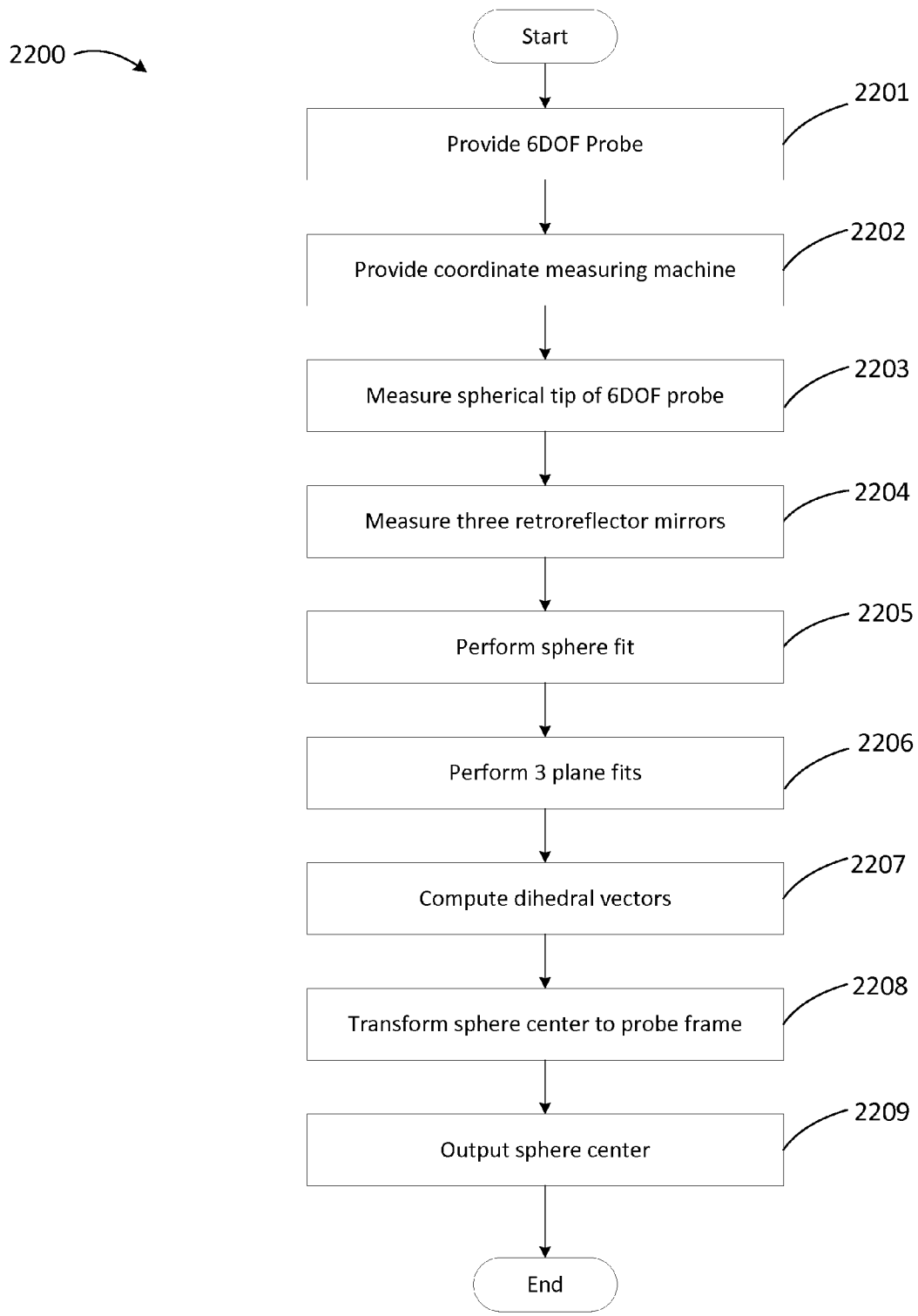
FIG. 22 depicts a flow chart which illustrates the steps in calibrating a 6DOF probe with a coordinate measuring machine, according to an embodiment of the invention.

One way to calibrate the 6DOF probe 601 is with a coordinate measuring machine (CMM) as shown in flow chart 2200 in FIG. 22. First in step 2201 6DOF probe 601 is provided. In step 2202 a coordinate measuring machine (CMM) is also provided. Then in step 2203 a series of points on the surface of the spherical tip is measured with the CMM, and in step 2204 a series of points on each of the three retroreflector mirrors is measured. Then in step 2205 a least squares sphere fit is performed. The radius of the sphere is known in advance from the manufacturer and so only the center needs be solved for. Then in step 2206 each of the three sets of mirror measurements is fitted with a plane by a least squares method, resulting in three normal vectors. In step 2207 the three dihedral vectors are computed by taking the vector cross product of each of three possible pairs of dihedral vectors. Then in step 2208 the position vector of the sphere center is transformed to the cube frame of reference, and finally in step 2209 the sphere center is output and the probe calibration is complete.

Figure 23:
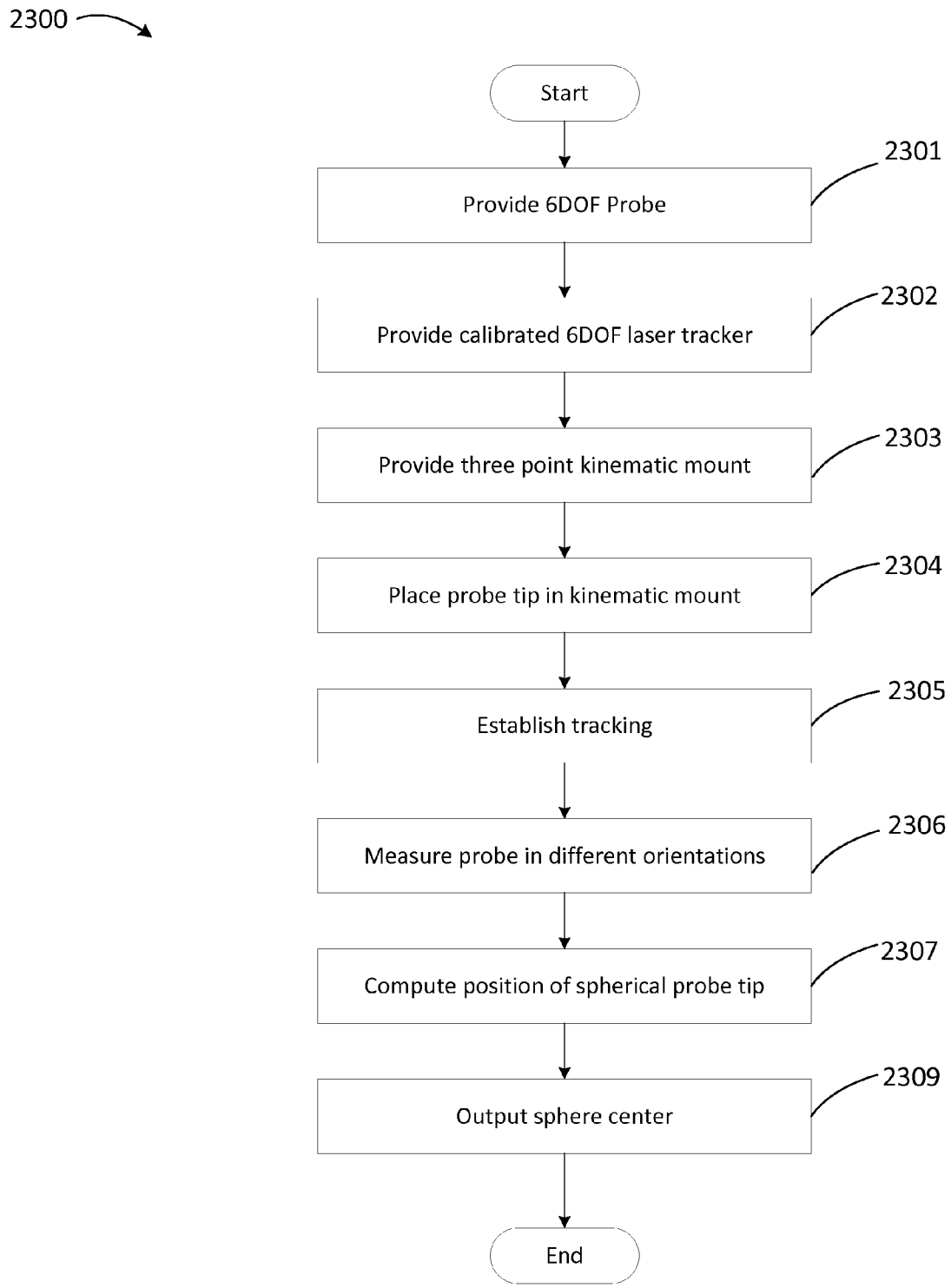
FIG. 23 depicts a flow chart which illustrates the steps in calibrating a 6DOF probe by means of a pivot calibration procedure, according to an embodiment of the invention.

Another way to calibrate the 6DOF probe 601 is by means of a so-called pivot calibration as described in flow chart 2300 in FIG. 23. In step 2301 a probe to be calibrated is provided. In step 2302 a 6DOF laser tracker is provided, and in step 2303 a fixed three-point kinematic mount is provided. Then in step 2304 the probe tip is placed in the kinematic mount, where it is allowed to rotate but not translate, and in step 2305 the probe mounted retroreflector is illuminated by the 6DOF laser tracker and a tracking condition, wherein the laser beam follows the retroreflector as it moves, is established. In step 2306 the probe is rotated to a series of different orientations and raw 6DOF measurements consisting of vertex position and rotation matrix are taken. In step 2307 a least squares fit calculation is performed in which the floating parameters are the cube frame coordinates of the spherical tip. Then finally in step 2309 the probe parameters, i.e. the sphere center coordinates expressed in the cube frame, are output. Different probe calibration methods can be substituted for these two without altering the substance or scope of the invention.

Figure 24:
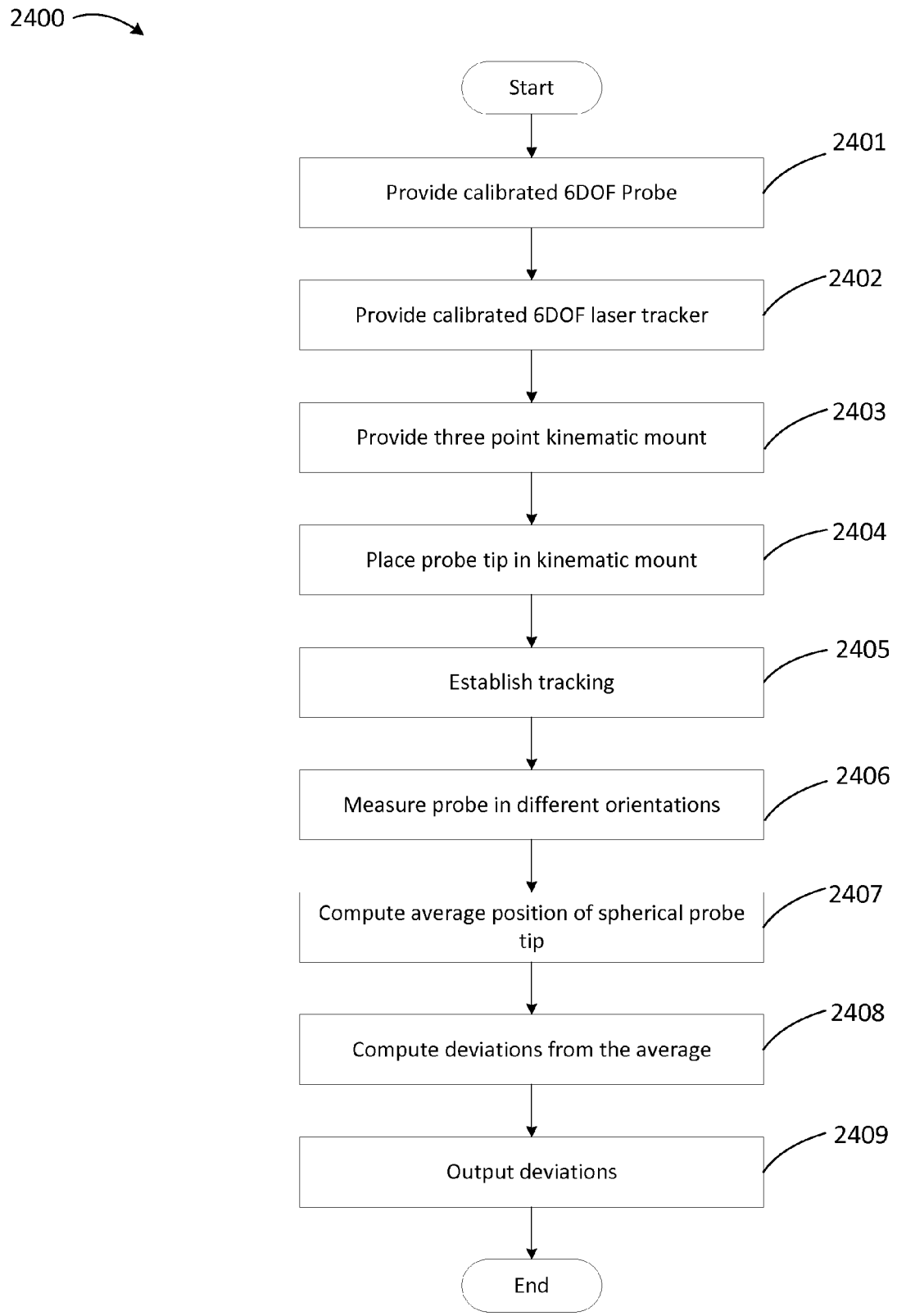
FIG. 24 depicts a flow chart which illustrates the steps in evaluating the accuracy of a 6DOF probe by means of a pivot test procedure, according to an embodiment of the invention.

In an embodiment which includes a 6DOF tracker and a 6DOF probe, it is possible to perform a convenient yet rigorous test to assure that the system as a whole satisfies accuracy requirements. The test is called a pivot test and is described in flow chart 2400 of FIG. 24. In step 2401, a calibrated 6DOF probe is provided, and in step 2402 a calibrated 6DOF tracker is also provided. Then in step 2403 a 3 point kinematic mount is provided. The kinematic mount must be secured to prevent movement relative to the 6DOF tracker. It allows the probe tip to rotate but not translate. In step 2404, the probe tip is placed in the kinematic mount, and in step 2505 the laser beam is aimed at the retroreflector which is mounted on the probe and tracking is established, enabling 6DOF measurements to be taken. In step 2406, the probe is moved into a series of different orientations while keeping the probe tip secured at a fixed position within the kinematic mount. Ideally, each of these measurements produces the same result for the position of the probe tip; in actual practice there will be small variations. In step 2407 all of the 6DOF measurements are averaged together. Then in step 2408 deviations are calculated. Each deviation is the difference between that particular measurement and the average of all measurements. The deviations, are then output in step 2409. These deviations provide a useful measure of the accuracy of the system.

Figure 5:
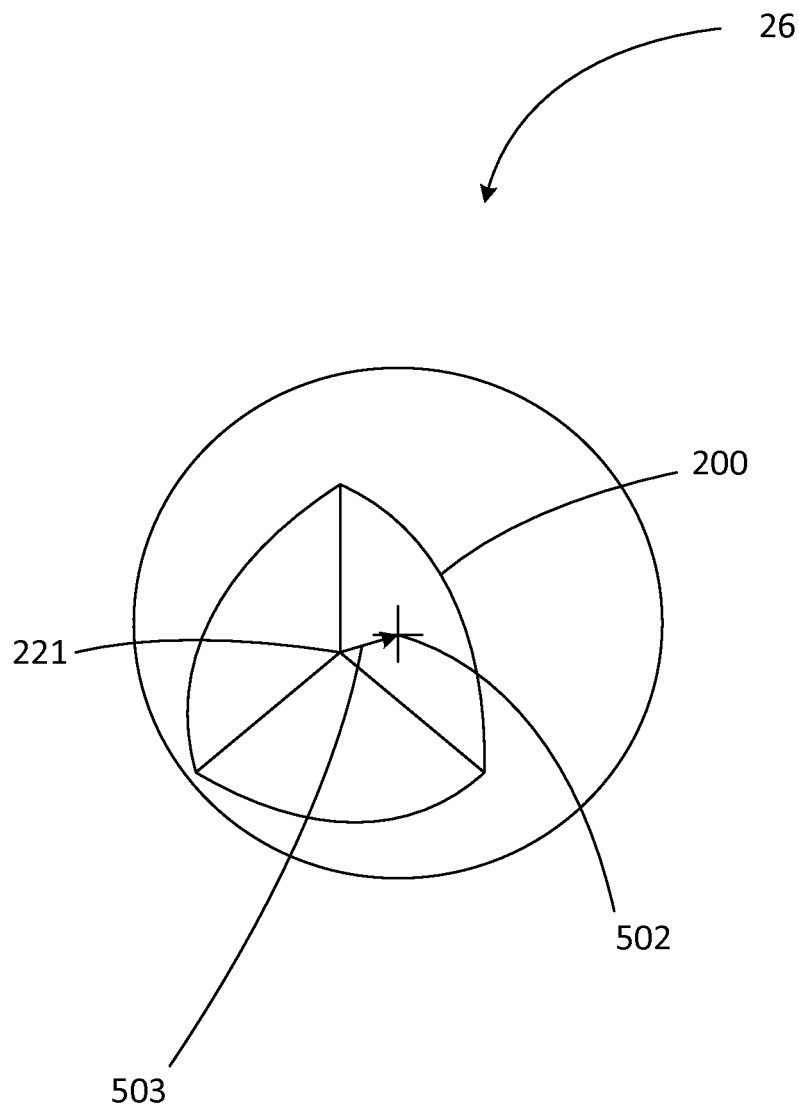
FIG. 5 is a diagram of a spherically mounted retroreflector with exaggerated nonzero centering error, the centering error being a displacement vector from the sphere center to the retroreflector vertex.
Figure 27:
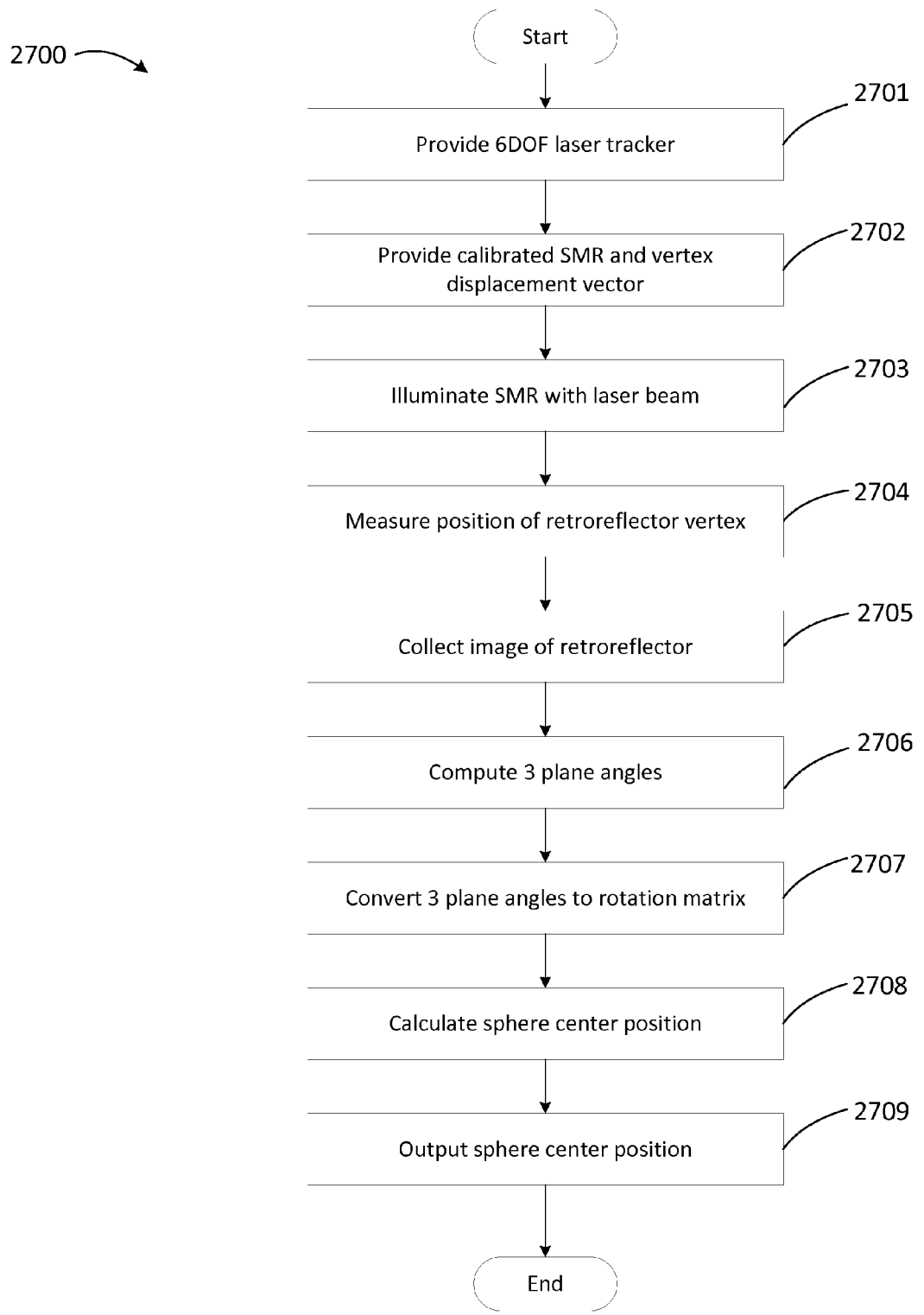
FIG. 27 depicts a flow chart which illustrates the steps in computing the corrected position of a spherically mounted retroreflector (SMR) by a 6DOF measurement, thereby removing error due to imperfect centering of the cube-corner vertex, according to an embodiment of the invention.

Another example embodiment is described with the aid of FIG. 1, FIG. 5 and flow chart 2700 in FIG. 27. In this embodiment, the invention is used to improve the accuracy of a spherically mounted retroreflector (SMR) position measurement by correcting for centering error. When a non-6DOF laser tracker measures an SMR, what it reports to the user is the position of the retroreflector vertex 221; but what is actually desired is the position of the center of the sphere 502. In a perfect SMR, the vertex exactly coincides with the sphere center, but in an actual SMR 26 the vertex is displaced from the center. The magnitude of the error 503 due to vertex displacement varies from one SMR to another, but a typical order of magnitude would be 25 micrometers. In accordance with an embodiment of the invention, this error can be removed. The method is described via flow chart 2700 in FIG. 27. First in step 2701 a 6DOF laser tracker is provided. Then in step 2702 a calibrated SMR is provided. In step 2703 the SMR is illuminated with laser beam 46. In step 2704 the vertex position is measured. Then in step 2705 an image of the retroreflector is collected. In step 2706 the three plane angles are computer by the FPGA and in step 2707 the three plane angles are converted to a rotation matrix as described hereinabove. In step 2708 the position of the sphere center is calculated as described hereinabove, and then in step 2709 the sphere center coordinates are output. The advantage of this approach is that the accuracy of SMR measurements is improved, and this increased accuracy is achievable with less expensive SMRs since the centering tolerance can be relaxed.

Figure 28:
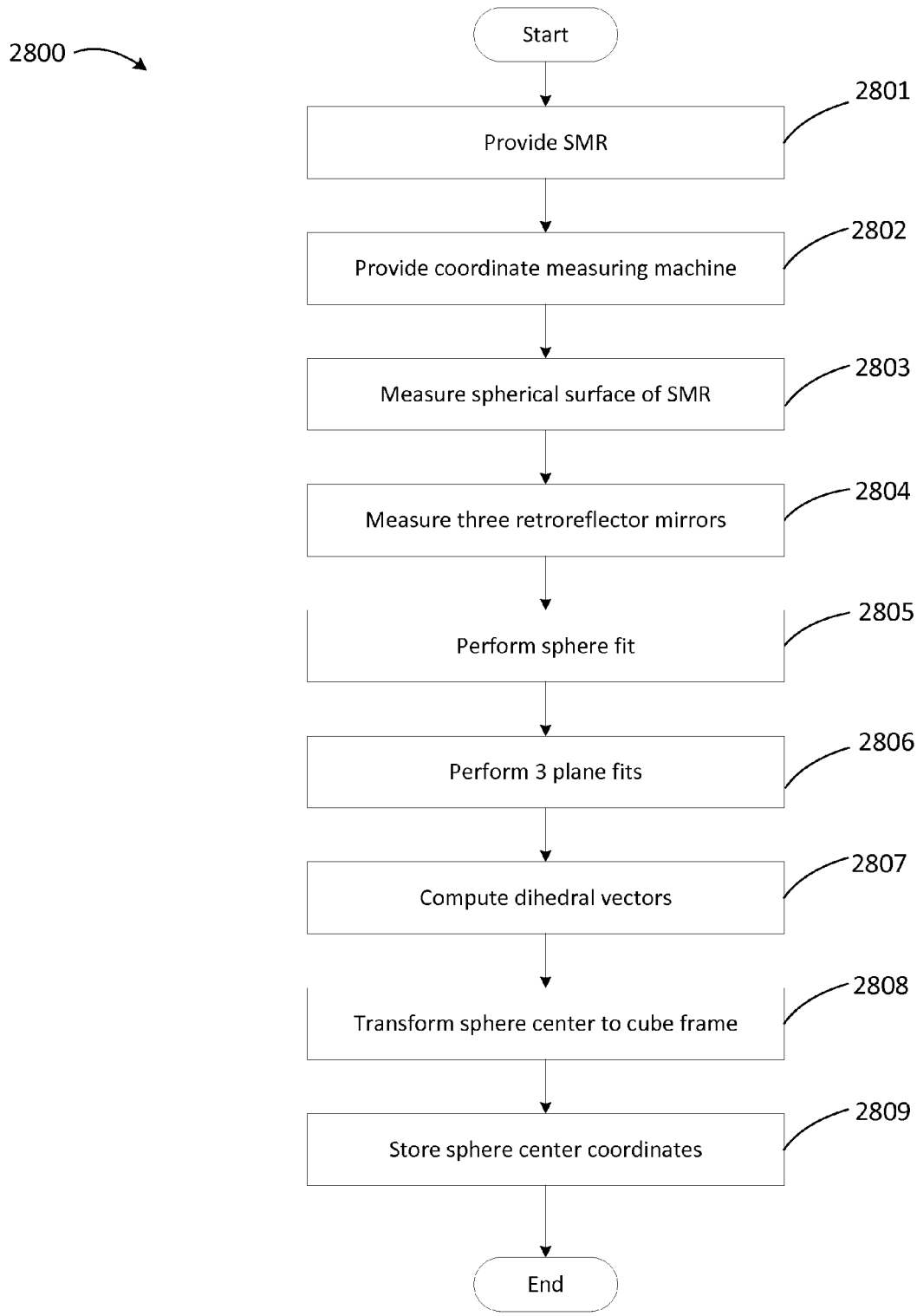
FIG. 28 depicts a flow chart which illustrates the steps in calibrating a spherically mounted retroreflector (SMR), which enables centering error to be corrected, according to an embodiment of the invention.

The procedure for calibrating an SMR is described in flow chart 2800 in FIG. 28. In step 2801 an SMR is provided. In step 2802 a coordinate measuring machine (CMM) is provided. In step 2803 multiple points on the surface of the sphere are measured. In step 2804 multiple points on each of the three mirrors are measured. The data reduction then begins with step 2805 with a least squares sphere fit, followed by step 2806 with three plane fits resulting in three normal vectors. In step 2807 the three dihedral vectors are obtained by taking the cross product of three possible pairs of normal vectors. Then in step 2808 the coordinates of the sphere center that were found in step 2805 are transformed to the cube frame of reference, and in the 2809 the three transformed sphere center coordinates are stored and/or output.

Figure 29:
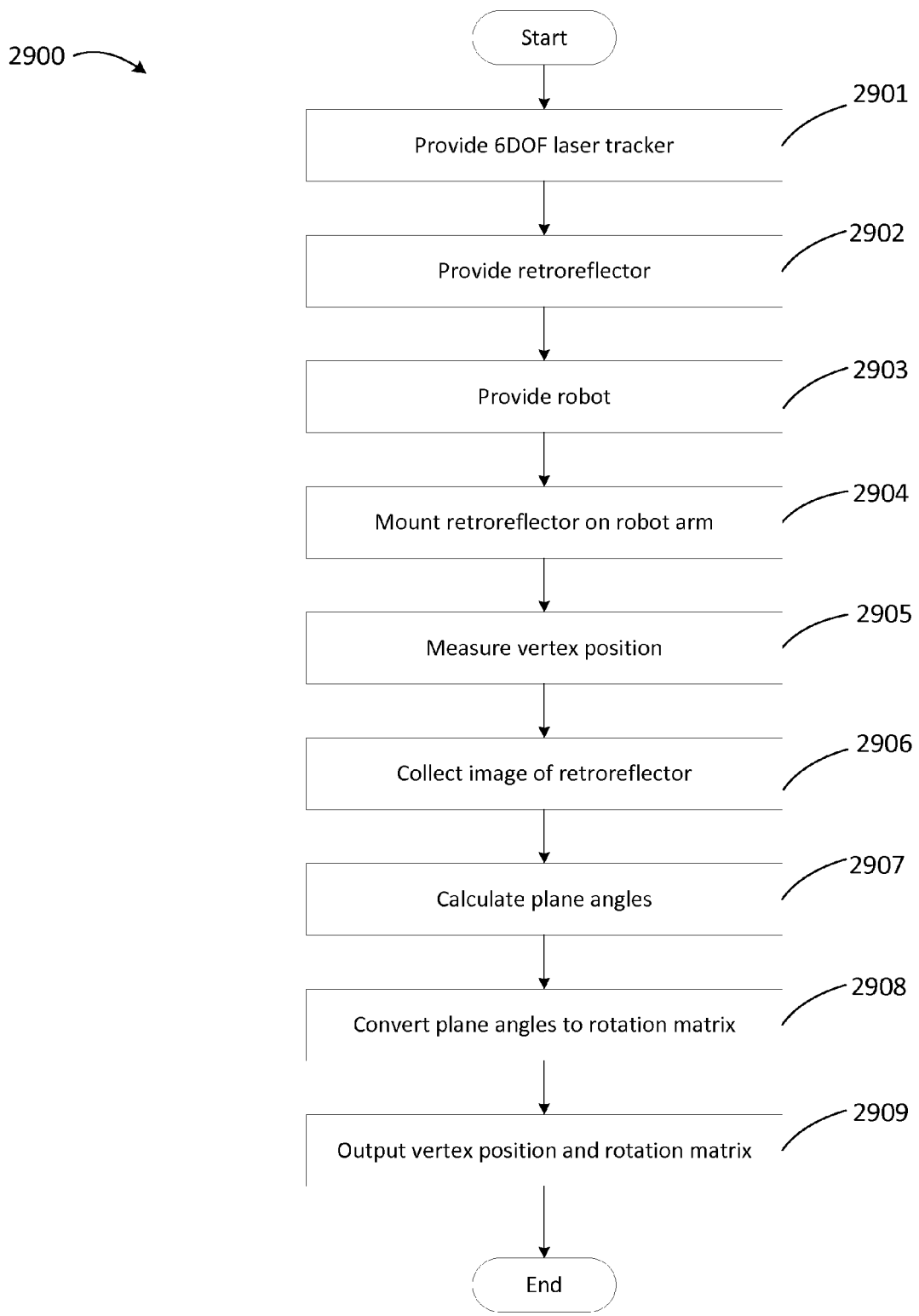
FIG. 29 depicts a flow chart which illustrates the steps in measuring the six degrees of freedom of a cube-corner retroreflector that is mounted on a robot arm, thereby allowing the robot arm position and orientation to be controlled to high precision, according to an embodiment of the invention.

In another example embodiment, the invention is used to measure the six degrees of freedom of a robot arm. The method is described in flow chart 2900 in FIG. 29. First in step 2901 a 6DOF laser tracker is provided. Then in step 2902 a cube-corner retroreflector is provided. Then in step 2903 a robot is provided, and in step 2904 the retroreflector is mounted rigidly on an arm of the robot. In step 2905 the vertex position is measured. Then in step 2906 an image of the retroreflector is collected. In step 2907 the three plane angles are computed by the FPGA, and in step 2908 the three plane angles are converted to a rotation matrix as described hereinabove. Finally in step 2909 the vertex position and the rotation matrix are output to the control system of the robot. The advantage of this arrangement is that it improves the accuracy with which the robot arm can be positioned and oriented, and this in turn enables the robot to perform tasks that otherwise would not be feasible.

Figure 8:
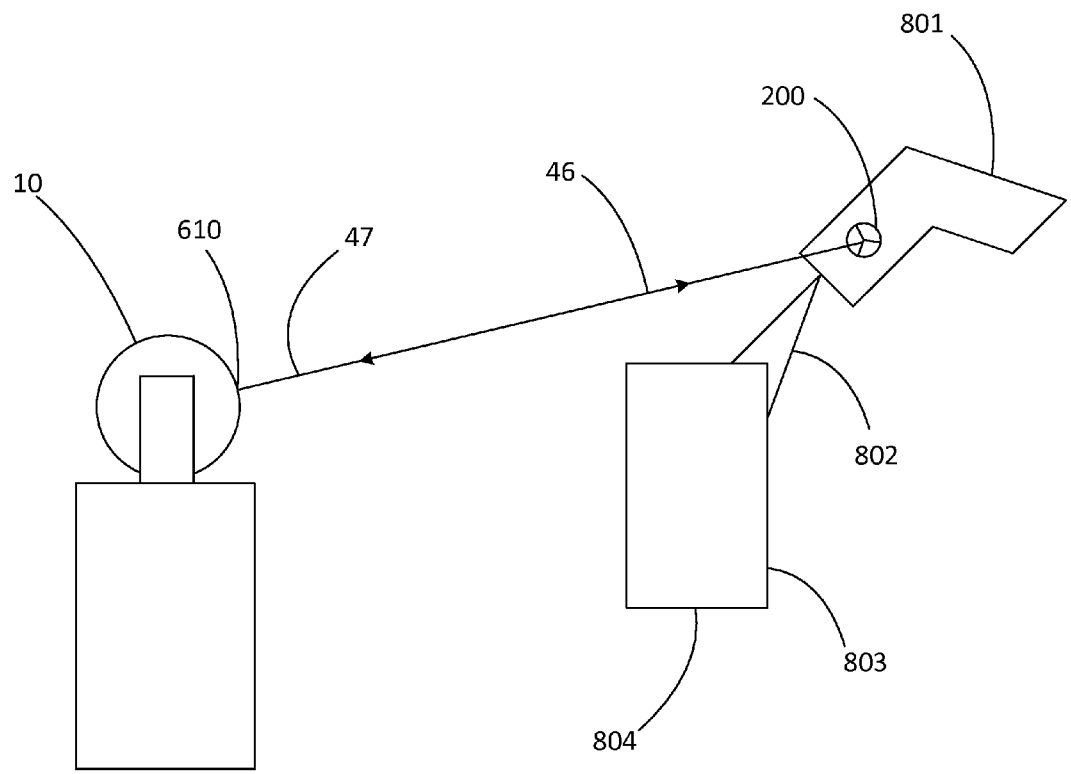
FIG. 8 depicts a laser line probe measuring a surface without direct physical contact while a 6DOF laser tracker measures the position and orientation of a cube-corner retroreflector that is mounted on the laser line probe, according to an embodiment of the invention.

Another example embodiment is shown in FIG. 8. In this embodiment, 6DOF laser tracker 10 is used in tandem with laser line probe 801 to measure surface 803 of part 804. This is accomplished by mounting cube-corner retroreflector 200 on the laser line probe and illuminating it with laser beam 46 from the 6DOF laser tracker aperture 610. This enables the laser tracker to measure the position and orientation of the laser line probe, and it in turn measures the surface with planar beam 802. This approach effectively converts the laser tracker into a touchless measuring system. Also, since cube-corner retroreflectors are relatively inexpensive, several of them can be mounted on the laser line probe, facing in different directions. This enables the system to continue to collect measurements regardless of the orientation of the laser line probe.

Certain details of the method described herein will now be described in greater detail, beginning with the issue of angular ambiguity. It will be noted that ambiguities exist in the solution for the plane angles. One of these is called roll ambiguity. For example, if the retroreflector is viewed straight on, then the three plane lines are spaced by 120 degrees. Because the three lines appear identical in an image, roll rotations of 0, 120 and 240 degrees are indistinguishable from one another. A second ambiguity is due to the fact that each plane line consists of two indistinguishable parts. On one side of the cube apex is the image of a true dihedral line. One the other side is an image of the dihedral line's reflection off the opposite face of the cube-corner retroreflector. Finally there is the inherent 180 degree ambiguity of a line in a plane. A line that is rotated 180 degrees gives back the same line.

These ambiguities can be resolved by simple methods. In an embodiment the high frame rate of the camera, typically at least 100 frames per second, assures that the plane angles for one frame differ only very slightly from the previous frame. The correct solution for the orientation for any given frame can be selected from the different ambiguous solutions by choosing the one which is closest to the solution for the previous frame. The only additional requirement is that the system must be properly initialized. This can be accomplished by putting the retroreflector into a standard orientation for which a precomputed solution exists. The precomputed solution is substituted for the previous frame solution when no previous frame exists. The precomputed solution may be stored in the tracker or in the computer which is being used to control the tracker or any other convenient place. Another approach is to place one or more marks or LEDs on the retroreflector housing. Their location within the 6DOF image is then used to resolve the ambiguity. Different methods of resolving angular ambiguities can be used without affecting the substance or scope of the invention.

Many different embodiments of the invention described herein are possible, depending upon the desired range, accuracy, cost, application and so on. For example, it has been found that the effects of atmospheric noise may be reduced by increasing the size of the retroreflector. Also, the cube-corner retroreflector may be an open-air type or solid glass type. In fact any transparent solid material can in principle be used. Herein we will use the term "solid glass" to refer to any transparent solid material. The solid glass type offers the advantage of larger field of view, which can be scaled by using different types of glass with different index of refraction values.

It is possible to extend the working range by accentuating the dihedral lines in some way. One practical approach is to bevel the lines. Another possibility is to etch the lines with an ion beam. These and other similar methods allow the lines to be effectively resolved by the camera at longer ranges.

In the case of a solid glass retroreflector, additional lines, circles, marks or other features may be imprinted on the front surface to improve the accuracy of the solution for the orientation, i.e. the rotation matrix, in the presence of atmospheric noise and other errors.

An important factor in the optical design is the image sensor. For maximum accuracy, a global shutter is best to minimize distortions due to motion of the target. This can be an integral part of the sensor itself, or it can be a separate component. Mechanical and electro-optical shutters are possible in different embodiments.

In some applications the sensor will be a grayscale type, while in others a color sensor will be preferable. Larger pixel bit depths will help to minimize discretization errors.

Another factor is exposure time. Since the retroreflector will be moving in general, exposure time should be minimized to minimize blur.

Another key factor is the number and size of the pixels in the image sensor. In the limit as the number and bit depth of image sensor pixels increases, discretization or pixelization effects become vanishingly small and the angular power spectrum method becomes more and more accurate. Conversely, as the pixels become larger and larger relative to the length of the lines and their bit depth decreases, systematic effects come into play which degrade the theoretical maximum accuracy. Such effects are especially prominent for lines at or near symmetry axes of the pixel array such as 0, 45 and 90 degrees. It is important to test the system at these critical angles.

Pixelization effects can also be reduced by the choosing a peak finding algorithm which is relatively insensitive to these effects. It is also possible to modify the overlap matrix to minimize such effects.

In validating a system design it is important to quantify angular bias due to pixelization. There are many ways to do this. One practical approach is through the use of simulations. For example, say the 2D discrete power spectrum is replaced by a uniform array in which every element has the same value. In this case, the angular power spectrum is ideally perfectly flat. Any deviations from perfect flatness are due solely to pixelization. Another test is to produce a simulated image which contains one or more lines whose angles are known by construction. In the ideal case, the resulting angular power spectrum will have a peak which is symmetric about the true angle. Once again, deviations from this ideal are due solely to pixelization. Such tests assure that the pixel count in the input image is adequate and also that the overlap matrix is correct.

Similarly, there are different possible optical designs. In an embodiment, there are no focusing optics; a collimated return beam is sent directly to the image sensor. This very simple design has many advantages in terms of cost and simplicity, and tests have shown that the special properties of the angular power spectrum method enable the extraction of plane angles from an unfocused image. This is another advantage of the angular power spectrum method over other approaches such as Hough and Radon transforms. In a related embodiment there is only a fixed beam expander which again produces an unfocused image. Designs of this type eliminate aberrations due to imperfect focusing optics. Different optical designs may be used without affecting the substance or scope of the invention.

In another embodiment, the camera optics are of the focusing type with automatic focus and approximately constant magnification as a function of range. In such a design, special care may be needed to assure that plane angles are not affected by focus adjustments due to aberrations and imperfect optical alignment. An electro-optical lens or mirror may be preferable to a translating focus lens in some cases. The depth of field should be large enough that every point on each dihedral line and its reflection can be brought into focus simultaneously. This is important since each dihedral line always lies partly along the line of sight in a retroreflecting geometry. If the depth of field of the camera is too small, peaks in the angular power spectrum will broaden and limit the resolution of the system as a whole. It may in some cases also add bias to the plane angle measurements.

A large aperture will improve the modulation transfer function (MTF) and enable the dihedral lines to be resolved at larger ranges.

In an embodiment, automatic focus is implemented by taking advantage of the traditional 3DOF measurement which is provided by the laser tracker. This means that the distance is known, and this can be used to set the focus position. Care must be taken to assure that the image is not degraded when the focus adjustment is in progress.

It will be appreciated that synchronization is critical for a 6DOF measurement. In other words, the position and orientation measurements ideally correspond to the exact same instant in time. Any error in synchronicity produces corresponding errors in the 6DOF measurement. In some embodiments there is the additional factor that the data rates of the two measurement streams may differ.

In the case where the two rates are equal, they can both use the same system clock to assure synchronicity. If the two rates are not equal, then special algorithms are needed. In particular, one of the data streams may need to be interpolated. In this case, a Kalman filter or similar approach can be used to improve the accuracy of the interpolation.

Different illumination methods may be used depending on the application. In an embodiment, the laser beam which is used for position measurements, i.e. 3DOF measurements, is also used for the orientation determination. This has the advantage of simplicity but in general does not fully illuminate the edges of the target. Another possibility is a separate light source which could be either a laser or LED. The separate light source could be either coherent or incoherent depending on the application. It could also be collimated or un-collimated.

Filtering is another important aspect of the angular power spectrum method, to reduce certain types of error sources and thereby increase accuracy. For example, portions of the 2D discrete power spectrum that lie inside circle 1120 in FIG. 11 correspond to low spatial frequencies and are the source of angular biases due to discretization and other effects. It is therefore appropriate in certain cases to discard those portions of the 2D discrete power spectrum. In addition, portions which lie outside circle 1121 in FIG. 11 should typically be discarded, since they introduce angular biases due to the square shape of the 2D discrete power spectrum which ideally should be circular. Image defects due to imperfect optics such as dirt and so on can be mitigated in this way. Another reason to filter is that it further reduces the FPGA memory needed to store the 2D discrete power spectrum.

The angular power spectrum has the useful property of being periodic with a period of 180 degrees. In other words, the leftmost and rightmost values of the angular power spectrum are ideally equal. This is a useful check that can be done to verify the validity of the angular power spectrum. It also means that the angular power spectrum can be fitted with a Fourier series if desired. If the Fourier series is computed, then undesired frequencies can be filtered out to remove certain types of errors from the refined peak estimates. This also provides another method for refining the peak estimates.

Another form of filtering that may be applied is Kalman filtering. Depending on the application, filtering can be applied to the probe tip position, the rotation matrix, or even the individual pixels of the input image.

In some cases the dominant form of aberration is caused by chaotic variations of the index of refraction of the air through which the laser beam propagates as a function of position and time. Such variations are caused by temperature stratification and random air currents, leading to noise levels which may well be too large in some applications. One standard method for minimizing such errors is adaptive optics. Practical adaptive optics systems are available commercially. Another approach is to increase the size of the cube-corner and the beam which illuminates it.

Tests have shown that if the surface temperature of the tracker exceeds the temperature of the surrounding air by more than a certain amount, then currents of warmed air which can cause large errors in the image may form near the tracker. In an embodiment, the FPGA is located in separate processor 50 of FIG. 1 to prevent the heat that is dissipated by the FPGA from causing this problem. In another embodiment the FPGA is mounted in the tracker in such a way that the surface temperature is only minimally affected by its presence. In this case a special heat transfer design is required to remove the heat in a non-destructive way.

It is also possible to construct specialized algorithms to reduce errors due to atmospheric refraction. For example, one can make use of the reflection symmetry which is a fundamental property of retroreflectors. In an ideal image, every point has a corresponding symmetric point which is on the opposite side of the cube-corner apex. In an ideal image these two points must have exactly the same pixel value. In a real image, the symmetry is degraded by atmospheric and other effects; but the symmetry can be restored by averaging pixels on opposite sides of the apex. This is a form of image correction which improves the accuracy of the solution for the plane angles and thus the orientation.

Another factor to consider in system design is the size of the image as measured in pixels. In other words, the optics and the image sensor must be compatible. Increasing the size of the image relative to the size of a pixel improves angular resolution and also reduces pixelization and discretization effects. The optical design, the sensor choice and the choice of the number of bins in the angular power spectrum must be mutually compatible and also compatible with the desired accuracy.

In sizing the system it is important to assure that discretization error falls within acceptable bounds. This can be done by creating simulated images with the intended pixel dimensions, with plane angles that are known by construction and then verifying that the angular power spectrum method produces results with acceptable error levels in all cases, i.e. at all angles. Another check is to compute the angular power spectrum of a uniform 2D discrete power spectrum. In this case the angular power spectrum is ideally perfectly flat. All deviations from perfect flatness must also fall within acceptable bounds based on the desired accuracy of the system design. These methods can also be used to assure that the radii of bounding circles 1120 and 1121 in FIG. 11, which are used in computing the overlap matrix, have optimum values.

In another embodiment, the 2D discrete power spectrum calculation 1303 in FIG. 13 is replaced by a different transformation. For example, since the laser tracker has a position sensitive device which allows it to track the target, the position of the retroreflector vertex 221 within the image is known. In principle all that is required is to apply a translational transform to the image to center it properly for the overlap matrix multiplication. This requires that the vertex position be known to relatively high accuracy, as any error in the translation will introduce bias into the calculation of the plane angles.

In conclusion, the present invention provides a 6DOF solution which avoids the limitations of existing augmented target approaches by imaging the retroreflector itself, while also avoiding the limitations of existing imaging algorithms. The invention is based on a specialized algorithm called the angular power spectrum method, which is designed expressly for the specific problem of extracting only the orientation from an image of a cube-corner retroreflector rapidly, reliably and accurately. For this specific problem, the new method is faster, more accurate and more robust than existing image analysis methods. It takes advantage of the special symmetry of a retroreflected image. It is also designed specifically for implementation in an FPGA, which increases the speed by another large factor. The upgrade of a laser tracker from 3DOF to 6DOF requires the addition of a camera and an FPGA. This new method supports all the applications of existing augmented-target technologies and adds something which they cannot do, namely the ability to improve the accuracy of standard SMR measurements.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed or contemplated for carrying out this invention, but that the invention will include all embodiments falling within the scope of the appended claims. Also, in the drawings and the description, there have been disclosed example embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another, unless otherwise stated. Furthermore, the use of the terms a, an, etc. do not denote a limitation of quantity, but rather denote the presence of at least one of the referenced item, unless otherwise stated.

What is claimed is:

1. A method for determining three orientational degrees of freedom of a retroreflector comprising:
   obtaining on a two-dimensional photosensitive array an image of a first straight mark, a second straight mark, and a third straight mark on the retroreflector that has three mutually perpendicular reflecting surfaces;
   receiving by a programmable control device a two-dimensional digital array representation of the image;
   performing with the programmable control device a two-dimensional transform of the two-dimensional digital array to obtain coefficients of sinusoidal basis functions as a first transformed array;
   determining by the programmable control device the three orientational degrees of freedom based at least in part on the first transformed array; and
   storing the determined three orientational degrees of freedom.

2. The method of claim 1 wherein, in the step of obtaining on a two-dimensional photosensitive array an image, the retroreflector is a glass prism that includes a front face.

3. The method of claim 2 wherein, in the step of obtaining on a two-dimensional photosensitive array an image, at least one of the first straight mark, the second straight mark, and the third straight mark is on the front face.

4. The method of claim 1 wherein, in the step of obtaining on a two-dimensional photosensitive array an image, at least one of the first straight mark, the second straight mark, and the third straight mark is on a line of intersection between two of the three mutually perpendicular reflecting surfaces.

5. The method of claim 1 wherein the step of obtaining on a two-dimensional photosensitive array an image further includes illuminating the retroreflector with a source of illumination and forming the image with a lens.

6. The method of claim 1 wherein the step of determining by the programmable control device the three orientational degrees of freedom further includes determining angular content from a power spectrum of the first transformed array.

7. The method of claim 6 wherein the step of determining by the programmable control device the three orientational degrees of freedom further includes extracting a collection of local maxima from the angular content.

8. The method of claim 1 wherein, in the step of receiving by a programmable control device a two-dimensional digital array representation of the image, the programmable control device includes a field programmable gate array (FPGA).

9. A non-transitory machine readable storage medium including machine readable instruction which, when performed by one or more processors, causes the one or more processors to perform a method comprising:
   obtaining on a two-dimensional photosensitive array an image of a retroreflector having three mutually perpendicular reflecting surfaces, the image including a first straight mark, a second straight mark, and a third straight mark;
   receiving by the one or more processors a two-dimensional digital array representation of the image;

performing with the one or more processors a two-dimensional transform of the two-dimensional digital array to obtain coefficients of sinusoidal basis functions as a first transformed array;

determining by the one or more processors three orientational degrees of freedom of the retroreflector based at least in part on the first transformed array; and storing the determined three orientational degrees of freedom.

10. A system for determining three orientational degrees of freedom of a retroreflector comprising:

the retroreflector having three mutually perpendicular reflecting surfaces, a first straight mark, a second straight mark, and a third straight mark;

a two-dimensional photosensitive array;

one or more processors; and a non-transitory machine readable storage medium including machine readable instruction which, when performed by the one or more processors, causes the one or more processors to perform a method comprising:

obtaining on the two-dimensional photosensitive array an image of the first straight mark, the second straight mark, and the third straight mark;

receiving by the one or more processors a two-dimensional digital array representation of the image;

performing with the one or more processors a two-dimensional transform of the two-dimensional digital array to obtain coefficients of sinusoidal basis functions as a first transformed array;

determining by the one or more processors three orientational degrees of freedom based at least in part on the first transformed array; and storing the determined three orientational degrees of freedom.

11. The system of claim 10, wherein the retroreflector is a glass prism that includes a front face.

12. The system of claim 11, wherein at least one of the first straight mark, the second straight mark, and the third straight mark is on the front face.

13. The system of claim 10, wherein at least one of the first straight mark, the second straight mark, and the third straight mark is on a line of intersection between two of the three mutually perpendicular reflecting surfaces.

14. The system of claim 10, further comprising a source of illumination and a lens configured to form the image.

15. The system of claim 10, wherein the one or more processors includes a field programmable gate array (FPGA).

* * * * *